US012561879B1

(12) United States Patent
Kwan

(10) Patent No.: US 12,561,879 B1
(45) Date of Patent: Feb. 24, 2026

(54) SYSTEMS AND METHODS FOR AVATAR ANIMATION BASED ON BIOMETRIC DATA

(71) Applicant: Shirley Kwan, Citrus Heights, CA (US)

(72) Inventor: Shirley Kwan, Citrus Heights, CA (US)

( * ) Notice: Subject to any disclaimer, the term of this patent is extended or adjusted under 35 U.S.C. 154(b) by 0 days.

(21) Appl. No.: 19/313,779

(22) Filed: Aug. 28, 2025

(51) Int. Cl.
G06T 13/40 (2011.01)
G06F 21/32 (2013.01)

(52) U.S. Cl.
CPC .............. G06T 13/40 (2013.01); G06F 21/32 (2013.01)

(58) Field of Classification Search
CPC ................................. G06T 13/40; G06F 21/32
See application file for complete search history.

(56) References Cited

U.S. PATENT DOCUMENTS

| | | | | |
|---|---|---|---|---|
| 9,198,622 | B2 | 12/2015 | Kaleal, III et al. | |
| 10,386,996 | B2 | 8/2019 | Santossio et al. | |
| 2012/0075463 | A1* | 3/2012 | Chen | H04N 23/23 |
| | | | | 348/E5.09 |
| 2013/0267204 | A1* | 10/2013 | Schultz | G06F 21/32 |
| | | | | 455/411 |
| 2014/0237587 | A1* | 8/2014 | Forbes | G06F 21/32 |
| | | | | 726/18 |
| 2017/0080346 | A1 | 3/2017 | Abbas | |
| 2018/0122123 | A1 | 5/2018 | Won et al. | |
| 2018/0255335 | A1 | 9/2018 | George et al. | |
| 2021/0209606 | A1* | 7/2021 | Herlands | G06Q 20/4016 |
| 2024/0362735 | A1* | 10/2024 | Lombard | G06Q 10/0635 |
| 2024/0380952 | A1* | 11/2024 | Ahamed | H04N 21/84 |
| 2025/0173415 | A1* | 5/2025 | Maizels | H04R 1/028 |
| 2025/0285736 | A1* | 9/2025 | Rothblatt | A61B 5/369 |

OTHER PUBLICATIONS

Ayush Agarwal et al., "Biometrics in Extended Reality: A Review", arXiv, Nov. 19, 2024, 34 pgs., Retrieved from the Internet: https://www.researchgate.net/publication/385920674_Biometrics_in_Extended_Reality_A_Review.

Daniel McDuff et al., "'Warm Bodies': A Post-Processing Technique for Animating Dynamic Blood Flow on Photos and Avatars", arXiv, May 14, 2025, 10 pgs., Retrieved from the Internet: https://arxiv.org/abs/2103.07987.

Troon Technologies, "AI-Powered Digital Avatars: The Future of Personalized User Experiences", Jan. 20, 2025, 15 pgs., Retrieved from the Internet: https://troontechnologies.com/blog/digital-ai-avatars/.

* cited by examiner

Primary Examiner — Maurice L. Mcdowell, Jr.
(74) Attorney, Agent, or Firm — SankerIP

(57) ABSTRACT

The various implementations described herein include methods for authenticating user participation in a virtual environment. In one aspect, a method is performed for a platform that includes an avatar representing a user. The method includes receiving biometric data for the user and comparing the received biometric data to stored biometric data for the user according to a predefined threshold. The method also includes, when the received biometric data falls within the predefined threshold in comparison to the stored biometric data, animating features of the avatar according to the received biometric data. The method further includes, in response to a determination that the received biometric data does not fall within the predefined threshold in comparison to the stored biometric data, ceasing animation of the features of the avatar. Animation of the features of the avatar indicates that the user is actively engaged on the platform.

20 Claims, 15 Drawing Sheets

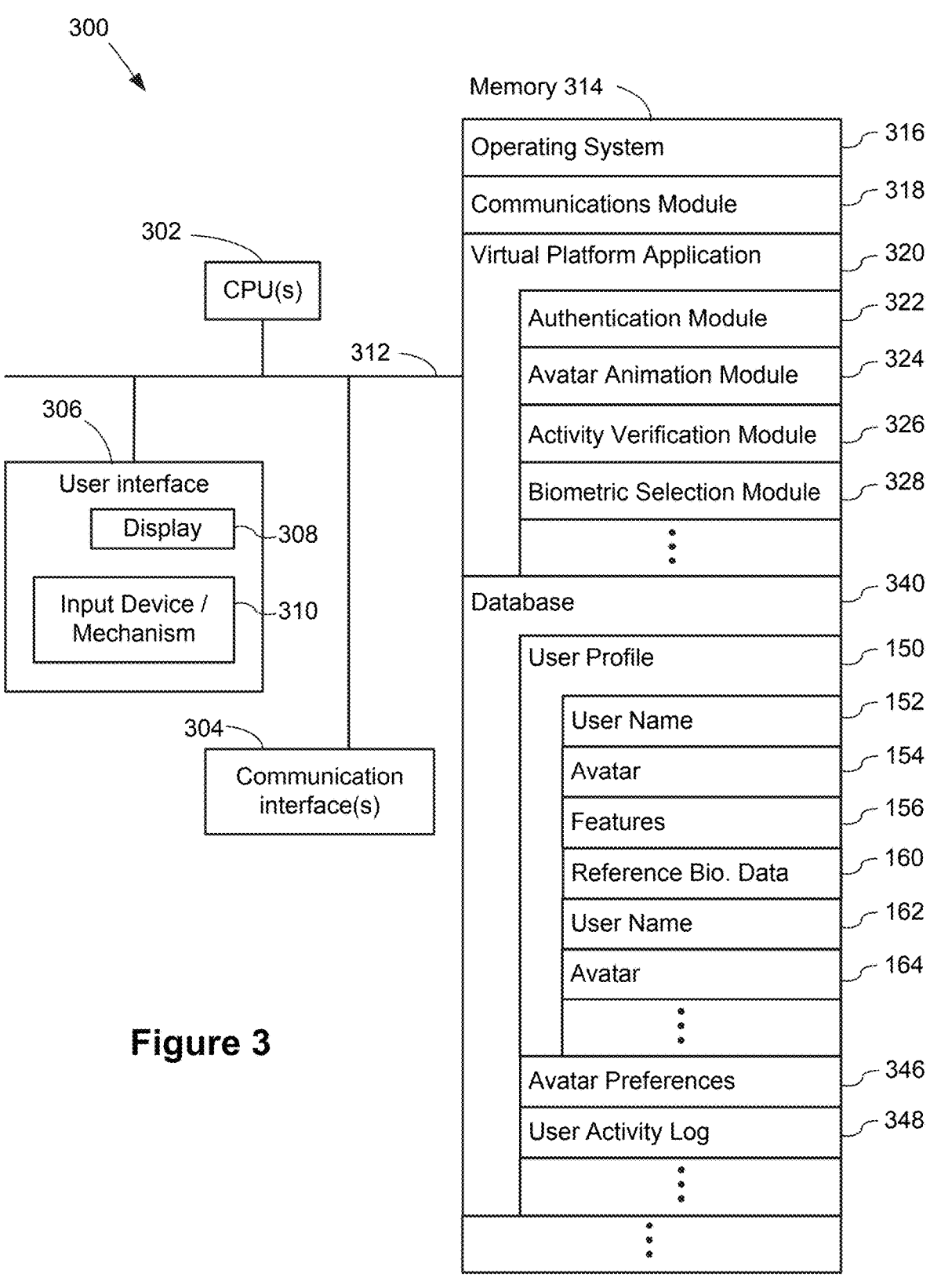

300

302

CPU(s)

306

User interface

Display 308

Input Device / Mechanism 310

312

304

Communication interface(s)

Figure 3

Memory 314

Operating System 316

Communications Module 318

Virtual Platform Application 320

Authentication Module 322

Avatar Animation Module 324

Activity Verification Module 326

Biometric Selection Module 328

Database 340

User Profile 150

User Name 152

Avatar 154

Features 156

Reference Bio. Data 160

User Name 162

Avatar 164

Avatar Preferences 346

User Activity Log 348

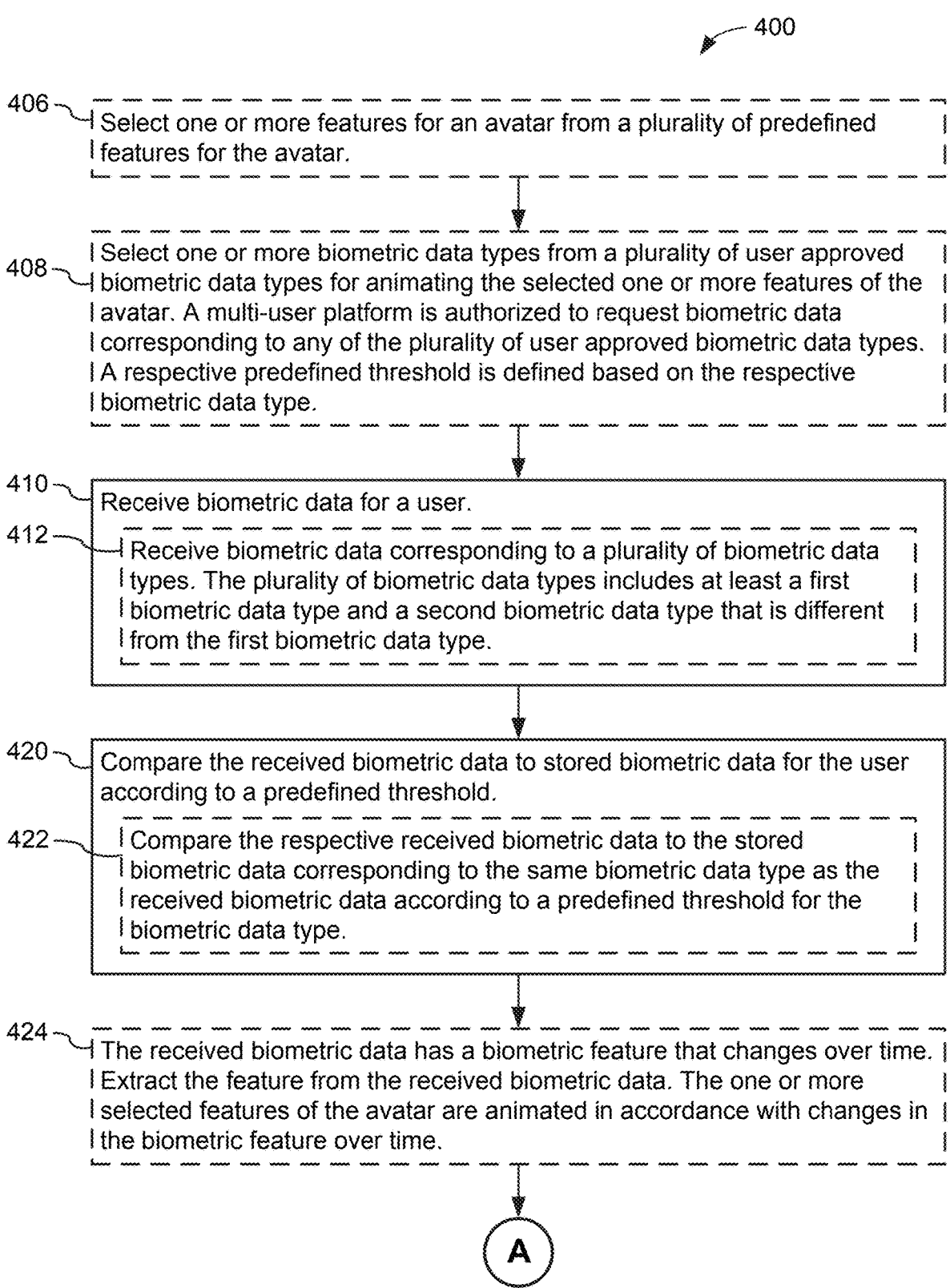

400

406 — Select one or more features for an avatar from a plurality of predefined features for the avatar.

408 — Select one or more biometric data types from a plurality of user approved biometric data types for animating the selected one or more features of the avatar. A multi-user platform is authorized to request biometric data corresponding to any of the plurality of user approved biometric data types. A respective predefined threshold is defined based on the respective biometric data type.

410 — Receive biometric data for a user.

412 — Receive biometric data corresponding to a plurality of biometric data types. The plurality of biometric data types includes at least a first biometric data type and a second biometric data type that is different from the first biometric data type.

420 — Compare the received biometric data to stored biometric data for the user according to a predefined threshold.

422 — Compare the respective received biometric data to the stored biometric data corresponding to the same biometric data type as the received biometric data according to a predefined threshold for the biometric data type.

424 — The received biometric data has a biometric feature that changes over time. Extract the feature from the received biometric data. The one or more selected features of the avatar are animated in accordance with changes in the biometric feature over time.

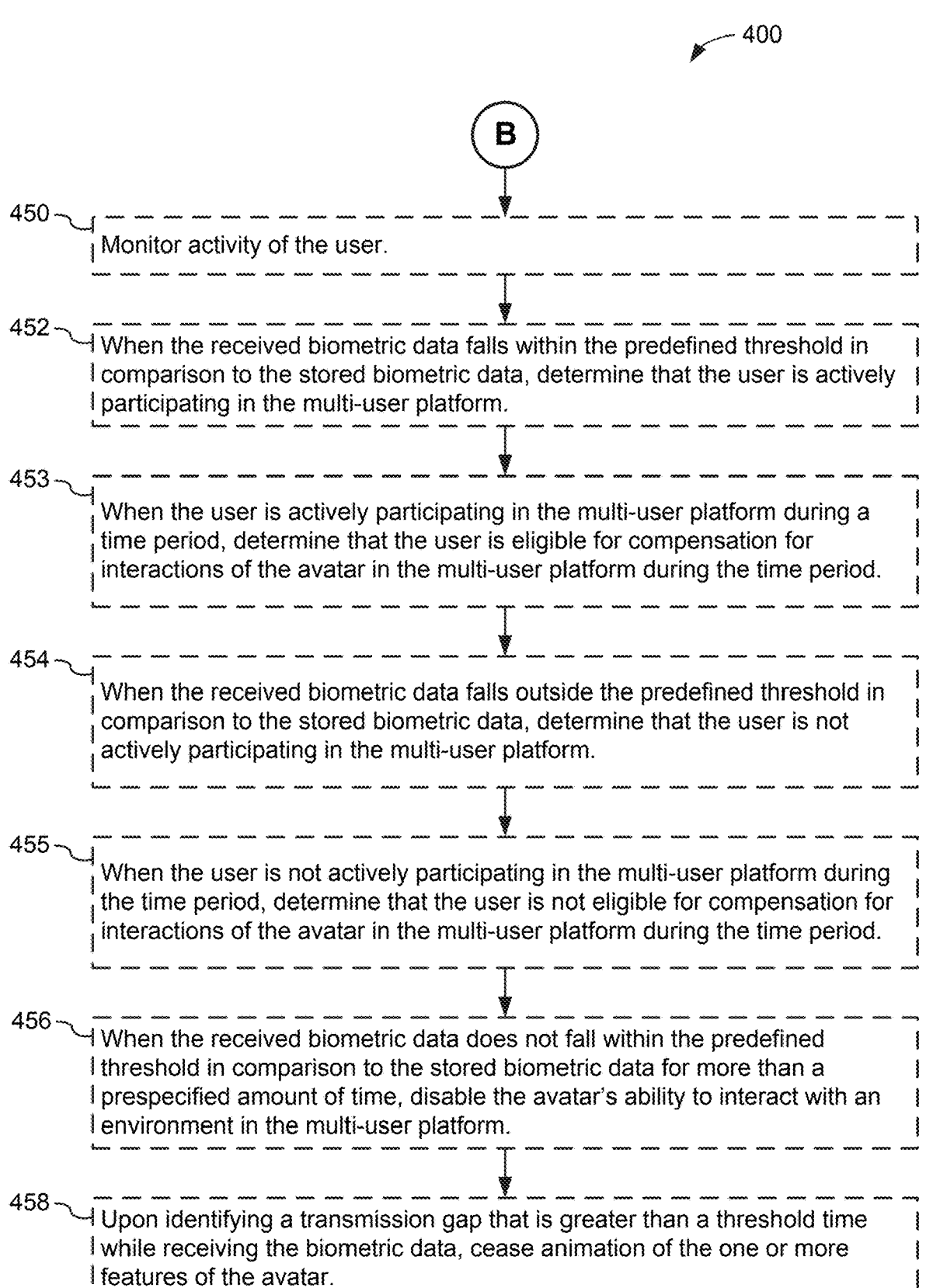

400

B

450 — Monitor activity of the user.

452 — When the received biometric data falls within the predefined threshold in comparison to the stored biometric data, determine that the user is actively participating in the multi-user platform.

453 — When the user is actively participating in the multi-user platform during a time period, determine that the user is eligible for compensation for interactions of the avatar in the multi-user platform during the time period.

454 — When the received biometric data falls outside the predefined threshold in comparison to the stored biometric data, determine that the user is not actively participating in the multi-user platform.

455 — When the user is not actively participating in the multi-user platform during the time period, determine that the user is not eligible for compensation for interactions of the avatar in the multi-user platform during the time period.

456 — When the received biometric data does not fall within the predefined threshold in comparison to the stored biometric data for more than a prespecified amount of time, disable the avatar's ability to interact with an environment in the multi-user platform.

458 — Upon identifying a transmission gap that is greater than a threshold time while receiving the biometric data, cease animation of the one or more features of the avatar.

Figure 4C

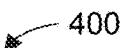
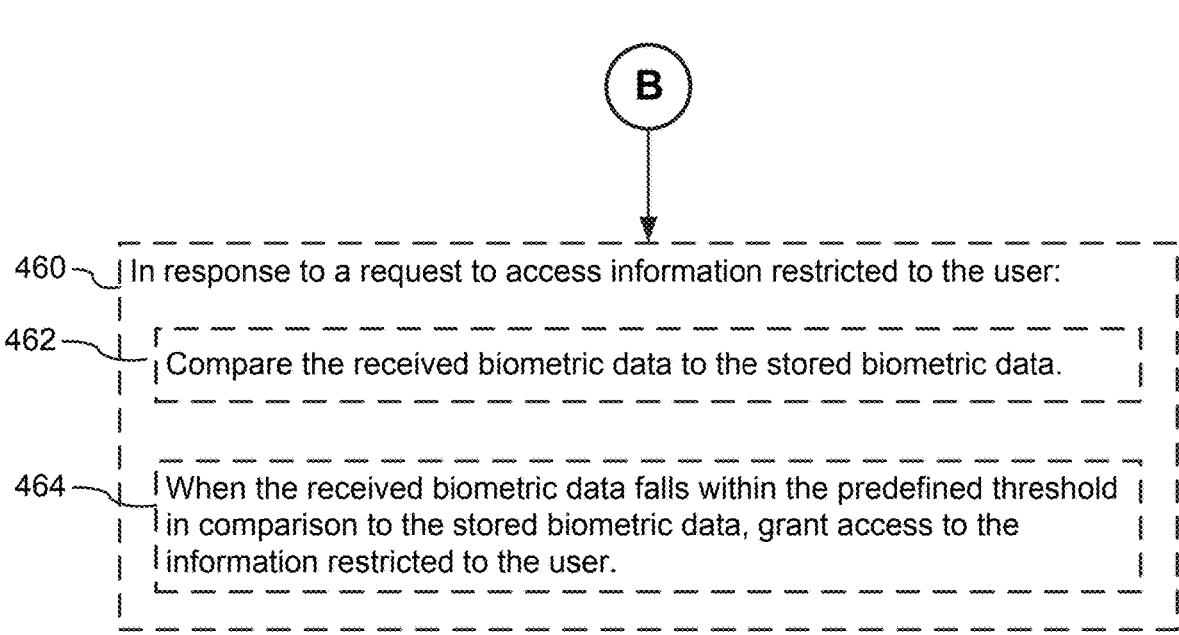
460 — In response to a request to access information restricted to the user:
462 — Compare the received biometric data to the stored biometric data.
464 — When the received biometric data falls within the predefined threshold in comparison to the stored biometric data, grant access to the information restricted to the user.
Figure 4D

400

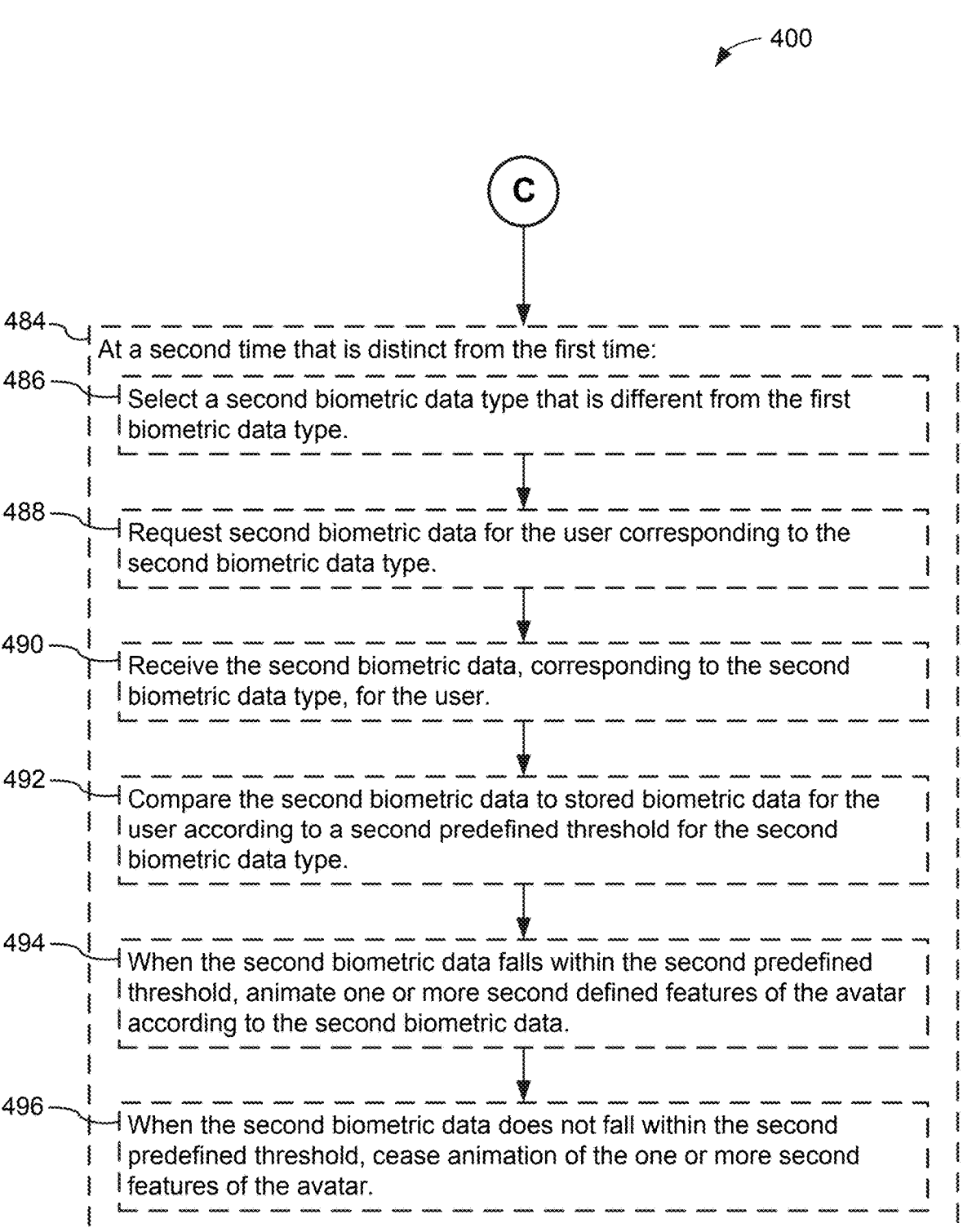

C

484 — At a second time that is distinct from the first time:

486 — Select a second biometric data type that is different from the first biometric data type.

488 — Request second biometric data for the user corresponding to the second biometric data type.

490 — Receive the second biometric data, corresponding to the second biometric data type, for the user.

492 — Compare the second biometric data to stored biometric data for the user according to a second predefined threshold for the second biometric data type.

494 — When the second biometric data falls within the second predefined threshold, animate one or more second defined features of the avatar according to the second biometric data.

496 — When the second biometric data does not fall within the second predefined threshold, cease animation of the one or more second features of the avatar.

Figure 4F

SYSTEMS AND METHODS FOR AVATAR ANIMATION BASED ON BIOMETRIC DATA

TECHNICAL FIELD

The disclosed implementations relate generally to participation authentication and more specifically to systems and methods of using biometric data to implement participation authentication in virtual environments.

BACKGROUND

Recent years have seen increased interest and development around virtual worlds that provide a simulated environment that users can interact with. These virtual spaces extend into casual and recreational spaces, such as gaming platforms, as well as into professional spaces, such as virtual web conferencing platforms. The development of such virtual environments has allowed people who may be physically located far from one another to interact, connect, and collaborate in ways that were not possible before. An important aspect of the success of such virtual platforms and the interactions that they facilitate is to verify the identity of a human purportedly represented by a user profile or an avatar in the virtual platform.

Current virtual platforms have relatively relaxed authentication requirements, usually allowing access to a user profile or an avatar representation in a virtual platform via a password or a shared link. Further, the human that the user profile or avatar purportedly represents is usually not verified or only verified once, during account creation. In many cases, continued or repeated verifications are non-existent, allowing accounts to be easily hijacked by other humans or controlled by automated bots.

SUMMARY

Disclosed methods and systems provide continued authentication so that a user profile or an avatar is being controlled by an authorized human associated with the account (not just any human or automated bot). This maintains the integrity of a virtual platform.

Disclosed are new systems and methods that verify the identity of participants engaging in a virtual environment.

The disclosed systems and methods for participation authentication utilize biometric data for authenticating the identity of a participant in a virtual platform. In some implementations, the biometric data is used to authenticate the user before providing access to restricted content (e.g., to access or update user information, or to join a private group). In some implementations, biometric data is also used to animate a virtual representation of the participant (e.g., an avatar representing the user) in such a way that indicates to other users interacting with the avatar that the identity of the user represented by the avatar is actively verified. In some implementations, the biometric data is also used to determine whether the user is actively participating in interactions with the virtual environment or as part of the virtual environment (e.g., such as in an online game) or with other participants on the platform. Such methods protect the virtual environment from being populated with automated bots and/or from individuals misrepresenting their identities by hijacking or user another individual's avatar in interacting with the virtual environment.

In accordance with some implementations, a method is performed for a multi-user platform having an avatar representing a user. The method includes receiving biometric data for the user and comparing the received biometric data to stored biometric data for the user according to a predefined threshold. The method also includes, when the received biometric data falls within the predefined threshold in comparison to the stored biometric data, animating one or more specified features of the avatar according to the received biometric data. The method further includes, when the received biometric data does not fall within the predefined threshold in comparison to the stored biometric data, ceasing animation of the one or more specified features of the avatar.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

In various circumstances, the systems and methods of the present disclosure have the following advantages over conventional systems for virtual platforms. Most platforms that allow users to interact with a virtual environment (such as but not limited to, a video game, a multi-player game, or a video conferencing platform) do not have any steps to verify that a participant (e.g., represented by an avatar and/or a user profile) on the platform is an active participant that is currently being controlled by a real human being. For example, a bot or program could be controlling an avatar, or an avatar may be present but idle (e.g., not actively participating, such as the case where a human user associated with avatar control has stepped away from the computer). First, in accordance with some implementations, the systems and methods of the present disclosure provide real time verification using biometrics that an avatar or profile representing a user is actually being actively controlled by a user. Second, in accordance with some implementations, the systems and methods of the present disclosure provide user-specific verification via biometric authentication. Thus, it would be much harder for an unauthorized user to generate fake biometrics and take control of an avatar or profile that is meant to represent (e.g., belong to) a different user. Third, in accordance with some implementations, the systems and methods of the present disclosure provide verification of active participation, which can be tracked by the platform to determine user engagement, user performance, and in some cases, provide rewards based on these determinations.

Thus, methods and systems are disclosed for participation authentication. Such methods and systems may complement or replace conventional methods and systems of verification in virtual environments.

BRIEF DESCRIPTION OF THE DRAWINGS

For a better understanding of the aforementioned systems and methods, as well as additional systems and methods that provide participation authentication for virtual platforms, reference should be made to the Description of Implementations below, in conjunction with the following drawings in which like reference numerals refer to corresponding parts throughout the figures.

FIG. 3 is a block diagram of an example computing device in accordance with some implementations.

FIGS. 4A-4F provide a flowchart of a method for authenticating user participation in a virtual environment in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The methods and systems of the present disclosure authenticate participants of a virtual environment using biometric data. In accordance with some implementations, the method and system review requested biometric data and compare the received biometric data to reference biometric data stored as part of the user's profile. In accordance with a determination that the received biometric data is within a prespecified range of the reference biometric data, the user is authenticated. In some implementations, the user's biometric data is collected while the user is actively engaged in the virtual environment, and used to provide an indication to other users of the virtual environment that the identity of the user represented by the user profile or avatar is currently verified. In some implementations, one or more features of an avatar representing the user is animated as an indication to other users of the platform that the user is an active and verified participant. In some implementations, one or more features of the avatar are animated based on the received biometric data. Thus, participants in a virtual platform can feel secure that other participants are actively engaged, and that avatar actions are being controlled by the associated (e.g., assigned) user.

In some instances, the word "user" means any person who participates in a virtual environment. In some instances, the word "user" refers to any person involved in a virtual environment and is authenticated using biometric data. In other instances, the word "user" refers to any person involved in a virtual environment, regardless of whether the user is authenticated using biometric data. For a virtual environment, there are a variety of roles, including ordinary users (who contribute biometric data for usage by the platform), moderators, owners, adjudicators (who prepare the rules and procedures for a virtual environment), and various third party personnel (e.g., maintenance staff). In general, the term "user" refers to any person who is authenticated for the virtual environment using biometric data, regardless of the person's role in the virtual environment.

Figure 1:
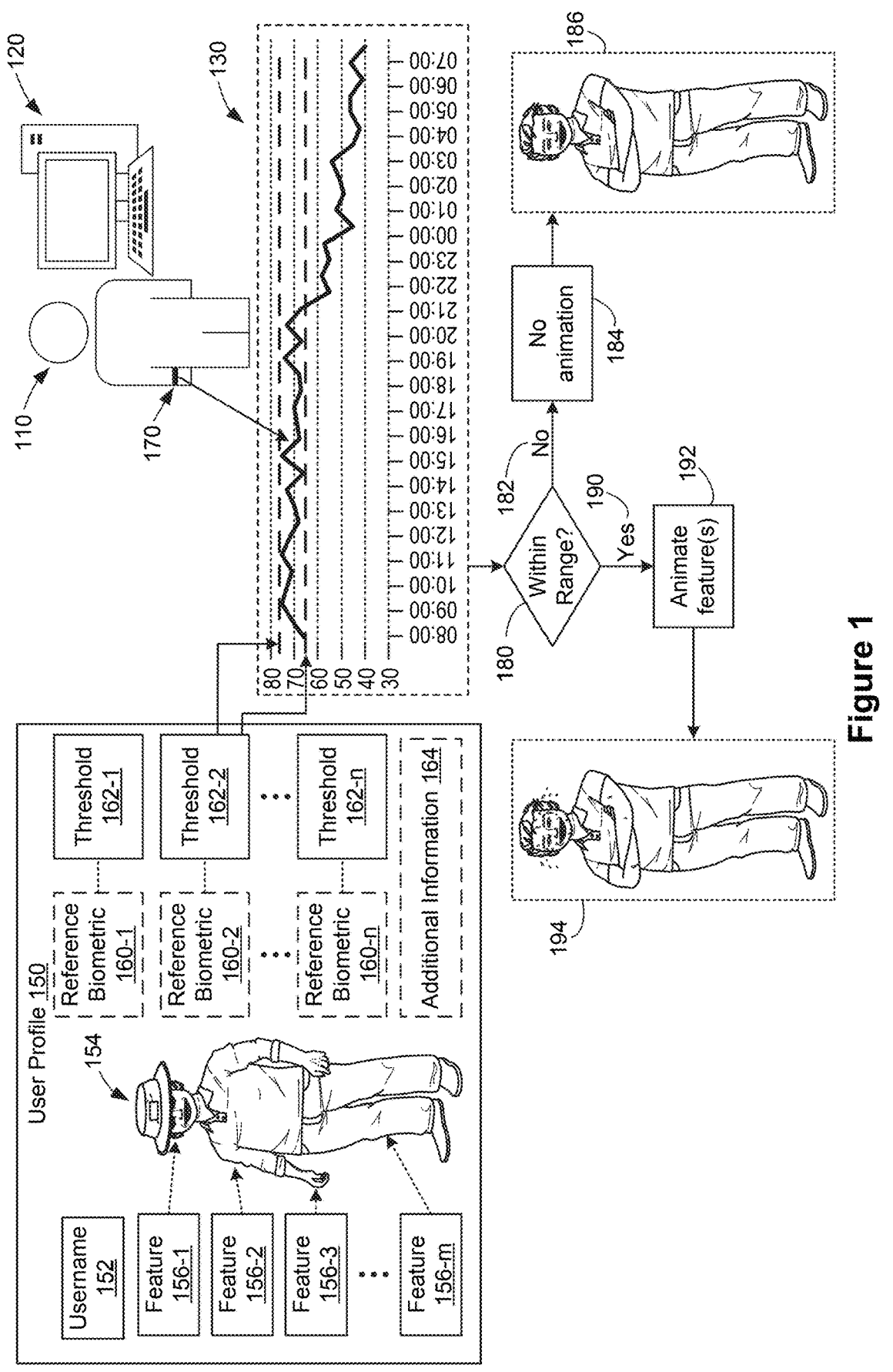
FIG. 1 provides an example of using biometric data to authenticate user participation in a virtual environment in accordance with some implementations.

FIG. 1 provides an example of using biometric data to authenticate user participation in a virtual environment in accordance with some implementations. FIG. 1 shows a user 110 that is participating in a virtual platform via a computing device 120. While the computing device 120 is shown in FIG. 1 as a desktop computer, the computing device 120 can be any device that is capable of connecting to and running the virtual platform. For example, computing device 120 can be a laptop computer, a tablet, a smart phone, a headset (e.g., a virtual reality headset or augmented glasses), a smart accessory (e.g., a smart watch or a smart wearable accessory).

A virtual platform (also referred to herein as a virtual environment, virtual world, or virtual space) refers to any simulated environment that allows people to interact with one another via a proxy, such as a username or an avatar. Examples of different virtual platforms include social media sites where people can interact with one another via a user profile or username (such interactions between user handles on a social media application to "like," "react," or comment on a video clip posted by another user, or direct messaging between two people who are represented by their dating profiles and names via a dating application), gaming applications (such as an online multiplayer game that allows users to play a video game with other users via character and/or username representation), or web conferencing applications (where users can allow users to speak, send messages, share files, and/or share screens with one another).

Each user registered on the user platform is associated with a user profile 150 that includes information regarding the user, such as proxy information (e.g., username, user handle, and/or avatar characteristics). A user profile 150 may include a username 152 (e.g., a user handle, such as "WolfShadow123" or "PlantMom") and an avatar 154 (e.g., an electronic image that is controllable by the user 110 and allows for interaction with the virtual environment and/or other users participating in the virtual environment via their respective avatars). The avatar 154 includes one or more defined features, such as features 156-1, 156-2, . . . , 156-*m* shown in FIG. 1. The defined features of an avatar can include, for example, facial features (e.g., eye shape, eye color, lip shape, and/or lip color), hair style, hair color, facial hair, facial marks and/or scars, make-up, skin color, clothing, shoes, accessories (such as a belt, a hat, gloves, a toy, or a backpack), body weight, body shape (e.g., muscular, thin, or heavy), and body movement (e.g., non-functional body movement such as jogging in place, sweating, blushing, doing jumping jacks, dancing in place, and/or playing with a toy or an accessory). In this example, the first feature 156-1 refers to eye movement of the avatar 154, the second feature 156-2 refers to non-functional activity of the avatar 154 (such as sweating or blushing), the third feature 156-3 refers to non-functional activity of the avatar's hands (such as clicking a pen or snapping fingers), and the mth feature 156-*m* refers to non-functional activity of the avatar's legs (such as jogging in place).

In some implementations, the virtual platform animates various features 156 of the avatar 154. In some implementations, the virtual platform animates an avatar 154 that includes a yo-yo toy to play the yo-yo or perform tricks with the yo-yo. In some implementations, the virtual platform uses animation of the avatar 154 to provide an indication to the user 110 of the avatar 154 or to other uses in the virtual platform that may be interacting with or operating near the avatar 154. For example, in a virtual conference room, the virtual platform may animate the avatar 154 to raise its hand or nod its head in response to user 110 selecting "yes" on a polling question provided during a meeting.

In some implementations, the virtual platform animates the avatar 154 to indicate that the user's identity is verified or that active participation from the user 110 is verified. For example, the virtual platform animates a glowing aura around the avatar to indicate that the identity of the user has been recently verified (e.g., within the last 5 minutes). This can, for example, provide assurance regarding the fidelity of a message that another user of the virtual platform is receiving from the user 110. For example, if a second user receives a message from the avatar 154 representing the user 110 while the avatar 154 is animated to have a glowing aura, the second user knows that the identity of the user 110 associated with the avatar 154 was recently verified and can trust that the message was actually sent by the user 110 (and not an imposter or an automated bot). In some implementations, animation of specific features of the avatar 154 alone provides an indication of authenticity (regardless of the pattern or frequency of animation).

In some implementations, the virtual platform animates the avatar 154 for the user 110 based on (e.g., is derived from, calculated from, corresponds to a same rate as, corresponds to a rate of change of) biometric data received from the user 110 (e.g., based on features in the biometric data or based on changes in the biometric data). For example, in response to receiving real-time or near-real time heart rate measurements for the user 110, the virtual platform animates the avatar 154 doing jumping jacks in place at a rate (e.g., 5 jumping jacks per minute) that is based on the measured heart rate of the user 110. In another example, the virtual platform animates changing skin color of the avatar 154 based on the measured skin temperature of the user 110. For example, in response to receiving real-time or near-real time skin temperature measurements for the user 110, the virtual platform animates the avatar 154 to have bright red checks. Animation of the avatar's cheeks color provides an indication to other uses on the platform that the user 110 associated with the avatar 154 is currently considered to be authenticated (e.g., was recently authenticated within a predetermined time period or is currently being authenticated) and also provides an indication of the user's state (e.g., red cheeks corresponding to high body temperature may indicate that the user 110 is excited and very engaged versus blue checks corresponding to a lower body temperature that may indicate that the user 110 is bored and has fallen asleep during the meeting).

In some implementations, animating one or more defined features 156 of the avatar 154 includes adding animating effects on a defined feature 156 of the avatar 154, such as animating texture on the skin of an avatar 154. In some implementations, animating one or more defined features 156 of the avatar 154 includes animating a light bulb above the avatar's head.

In some implementations, the avatar 154 is customizable by the user so that the avatar has a unique appearance when present in the virtual platform. In some implementations, a user can select from a set of available avatars.

The user profile 150 also includes reference biometric data 160 corresponding to the user 110 associated with the user profile 150. Reference biometric data 160 (e.g., the reference biometrics 160-1, 160-2, . . . , 160-n) refers to any biometric measurement results (e.g., results from an electrocardiogram (EKG or ECG) that measures electrical signals from the heart, or results from a heart rate monitor that measure the user's pulse rate or heart rate) and statistics that are calculated based on analysis of biometric measurement results (e.g., average heart rate and standard deviation as determined from analysis of heart rate measurements or average body temperature).

In some implementations, biometric data used for authentication is handled by an authentication module, which may be part of the virtual platform or part of a service that is used by the virtual platform for authentication.

In some implementations, as part of the user profile setup process, the user 110 is prompted to select one or more biometric data types that the platform is allowed to access for authentication and/or verification purposes. For each selected biometric data type, the user 110 also provides reference biometric data (such as the reference biometric data 160-1, 160-2, . . . , 160-n, which is also referred to herein collectively or singly as the reference biometric data 160) corresponding to the biometric data type. For example, if the user 110 identifies "heart rate" as a biometric data type that the platform is allowed to access, then the user 110 provides reference biometric data 160 that is the heart rate of the user 110. In some implementations, the reference biometric 160 provided is captured by a device 170 (e.g., a wearable device) and provided to the platform during the user profile setup process. In some implementations, the reference biometric data 160 provided was captured by the device 170 at a time prior to the user profile setup and is stored on the device 170. In some implementations, the device 170 is a wearable device 170 that is capable of capturing biometric data, such as a heart monitor, a smart watch, or a smart ring. In some implementations, the device 170 is a personal device (e.g., a tablet, a computer, or a phone), which receive and stores information from a biometric sensor. For example, the device 170 may be a smart phone that has an inertial measurement unit that captures the number of steps taken by the user 110. In another example, the device 170 is a smart watch that measures the user's heart rate. In yet another example, the device 170 is a tablet that includes an application that is linked to a smart ring that is worn by the user and configurable to capture sleep patterns of the user.

In some implementations, the authentication module analyzes the reference biometric data 160 and generates a predefined threshold 162 (e.g., the thresholds 162-1, 162-2, 162-n, which may represent a predefined range, a predefined value, or a predefined pattern) based on the reference biometric data 160. In some implementations, the predefined threshold 162 includes a range of values that are considered acceptable (e.g., consistent with the reference biometric data 160) for the given biometric data type. In some implementations, the predefined threshold 162 includes a pattern that is considered acceptable (e.g., consistent with the reference biometric data 160) for the given biometric data type. The predefined threshold 162 is used for authentication and verification purposes in the future. For example, for the heart rate biometric data type, the authentication module may analyze reference heart rate for the user 110 and determine that the user's heart rate generally falls between 65 beats per minute (bpm) and 75 bpm when the user is actively engaged in using the platform. Thus, the authentication module may define the predefined threshold 162 associated with heart rate biometric data for the user 110 to be between 65 bpm and 75 bpm. Following this example, when a need for authentication arises in the future, the authentication module can compare received heart rate biometric data to the predefined threshold 162 to determine whether or not the user is actively engaged in the platform and/or if the user controlling the proxy in the platform is the same person as the one registered in the user profile 150. For example, the user 110 may have fallen asleep while playing a cooperative video game and thus, the heart rate may have dropped below the predefined threshold 162 corresponding to the heart rate biometric type. In this case, the authentication module is not able to verify the user's identity or that the user is actively engaged in the virtual platform. In another example, a different person may have hijacked the user's account and the user 110 can deny provision of the biometric data requested from the authentication module. With no received biometric data to compare to the predefined threshold, the authentication process is not able to authenticate the identity of the user or that the user is actively participating in the virtual platform. In a third example, the device 170 is a device used to control user actions in the virtual platform (such as a gaming controller). In response to a request from the authentication module, the authentication module receives body temperature data for a person using the gaming controller that is collected by one or more sensors on the gaming controller. In response to a determination that the body temperature received from the gaming controller is outside a predefined threshold 162 stored in the user profile, the authentication module is not able to verify that the person using the gaming controller is the user 110.

In some implementations, the predefined threshold 162 is automatically determined by the authentication module. In some implementations, the predefined threshold 162 is customizable by the user 110.

In some implementations, the user profile 150 stores the reference biometric 160 as part of the user profile 150. In some implementations, the user profile 150, after determining the predetermined thresholds 162, does not store the reference biometric data 160 as a security measure to prevent the user's biometric data from being stolen or corrupted.

In some implementations, the predefined threshold 162 includes one or more absolute values. For example, a predefined threshold of 65 bpm to 75 bpm for heart rate for user 110. In some implementations, the predefined threshold 162 includes one or more relative values. For example, a predefined threshold may include a requirement that received heart rate data is within +/−5 bpm from the average heart rate of the user 110. In another example, a predefined threshold regarding a user's fingerprint may require that received fingerprint does not deviate in patterns and features from the user's fingerprint by more than 15%. When the predefined threshold 162 includes relative values, the user profile 150 stores the reference biometric 160.

The user profile 150 can also include additional information 164 regarding the user 110. For example, in addition to reference biometric data 160 and predefined thresholds 162 for different biometric data types, some implementations include information such as known geolocations (e.g., common or saved locations that the user frequents or often accesses the virtual platform from, such as the user's home, office, or a known friend's house), known internet protocol (IP) addresses (such as an IP address associated with the user's home desktop computer), and saved payment methods. In some implementations, the additional information 164 includes demographic and/or contact information for the user, such as the user's email address, phone number, emergency contact information, physical address, age, gender, registered location (e.g., Osaka, Japan or Chicago, Illinois, United States of America). In some implementations, the additional information 164 includes information used in an authentication or verification process. For example, in response to a determination by the authentication module that the virtual platform is being accessed from a computer with an IP address in Canada, but metadata from the device 170 sending requested biometric data to the authentication module indicates that the device 170 is in Croatia, the authentication module may raise one or more flags and require additional verification to complete the authentication process.

FIG. 1 also illustrates an example process of authenticating a user 110 whose user profile 150 and account is already registered and setup in the virtual platform. While the user 110 is participating in the virtual platform, the virtual platform may require authentication that the user 110 is consenting to participation in the virtual platform, actively participating in interactions on the virtual platform, and/or the user controlling interactions via the proxy (e.g., the avatar, the username, and/or the user profile) is who it is purported to be (e.g., is the same person 110 associated with the registered user profile 150.

Some examples of instances where authentication or verification is needed include:
- logging or signing into the virtual platform as a user associated with the user profile 150;
- requests to access private, personal, and/or restricted information, such as a request to update information in the user profile 150, a request to view "hidden" information in the user profile, or a request to access a portion of the virtual environment that is restricted to specific membership;
- participation in an activity with rewards (including virtual rewards such as experience points and/or rewards that can be translated into real-world value such as token rewards that can be exchanged for gift cards);
- direct or intentional interaction with other uses, such as sharing a file, requesting to add another user as a "connection," sending a direct message to another user on the virtual platform, responding to a poll, and/or voting on the virtual platform.

When authentication or verification of the user's identity and/or active participation is required, the authentication module sends a request for biometric data. In some implementations, the request is sent to a device 170 that has been registered by the user 110 as part of the user profile 150, where the user has: 1) granted permission for the authentication module to communicate with the device 170, and 2) verified that the device 170 belongs to the user 110 and that information received from the device 170 corresponds to biometric data for the user 110. In some implementations, the user 110 may register more than one device on the user profile 150. In such cases, each registered device is associated with one or more biometric data types and the biometric data type requested determines which device the request is sent to. In some implementations, such as when the authentication module requests more than one type of biometric data, the authentication module may send separate requests for biometric data to more than one device.

In some implementations, the authentication module is configurable to make an ad hoc selection (from the list or pre-approved biometric data types, as determined by the user 110) of which biometric data types to request for an authentication request (e.g., an authentication event, an authentication requirement, or an authentication instance). This adds a dimension of randomness/unpredictability, which enhances security, while still allowing the user to maintain control of what types of biometric data are being used by the authentication module.

In response to a request for biometric data, the authentication module receives the requested biometric data 130 from the contacted devices 170. Each instance of received biometric data 130 is compared to information regarding reference biometric data 160 of the same biometric data type using the corresponding predefined threshold 162. For example, in response to a request for skin temperature data, the device 170 measures and sends skin temperature data to the authentication module for comparison to reference biometric data 160 that is recorded measurements of the user's skin temperature. The authentication module utilizes the predefined threshold 162 for skin temperature (e.g., within 0.3° C. (° C.) of the reference skin temperature for the user 110, between 36.8° C. and 37.4° C.).

In response to a determination that the received biometric data 130 falls within the corresponding predefined threshold 162 (i.e., for the same biometric data type), the user's identity and/or active participation is confirmed. In some implementations, when the user's identity and/or active participation has been verified, the authenticator informs the virtual platform so that the user 110 may proceed to engage in the virtual platform. In some implementations, in response to an indication from the authentication module that the user's identity and/or active participation is verified, the virtual platform animates one or more defined features of the avatar 154 to provide an indication to other users of the virtual platform that the user 110's identity and/or active participation has been verified. For example, the virtual platform may animate a shirt worn by the avatar 154 to be green in color in response to a determination that the user's identity and/or active participation is verified, and that all avatars wearing a green shirt in the virtual platform are understood by users of the platform to be currently verified users. In another example, the virtual platform may animate eye blinking of the avatar 154 where the rate of eye blinking is based on (e.g., determined by) a measured systolic blood pressure of the user 110. In the example shown in FIG. 1, the authenticator determines (180) whether the received biometric data 130 is within the threshold range. When the biometric data 130 received from the device 170 associated with the user 110 falls (190) within the predefined threshold 162-2 in comparison to the reference biometric 160-2, the system animates (192) the avatar. In this instance, the reference biometric and the received biometric data are heart rate data and the predefined threshold 162-2 is a threshold for heart rate data. The avatar 154 shows as sweating. When the received biometric data 130 is (182) outside the predetermined range, the avatar 154 is animated (184) without sweat 186 (e.g., animation of sweating of the avatar 154 ceases).

FIGS. 2A-2G provide various examples of animating an avatar using biometric data in accordance with some implementations.

Figure 2A:
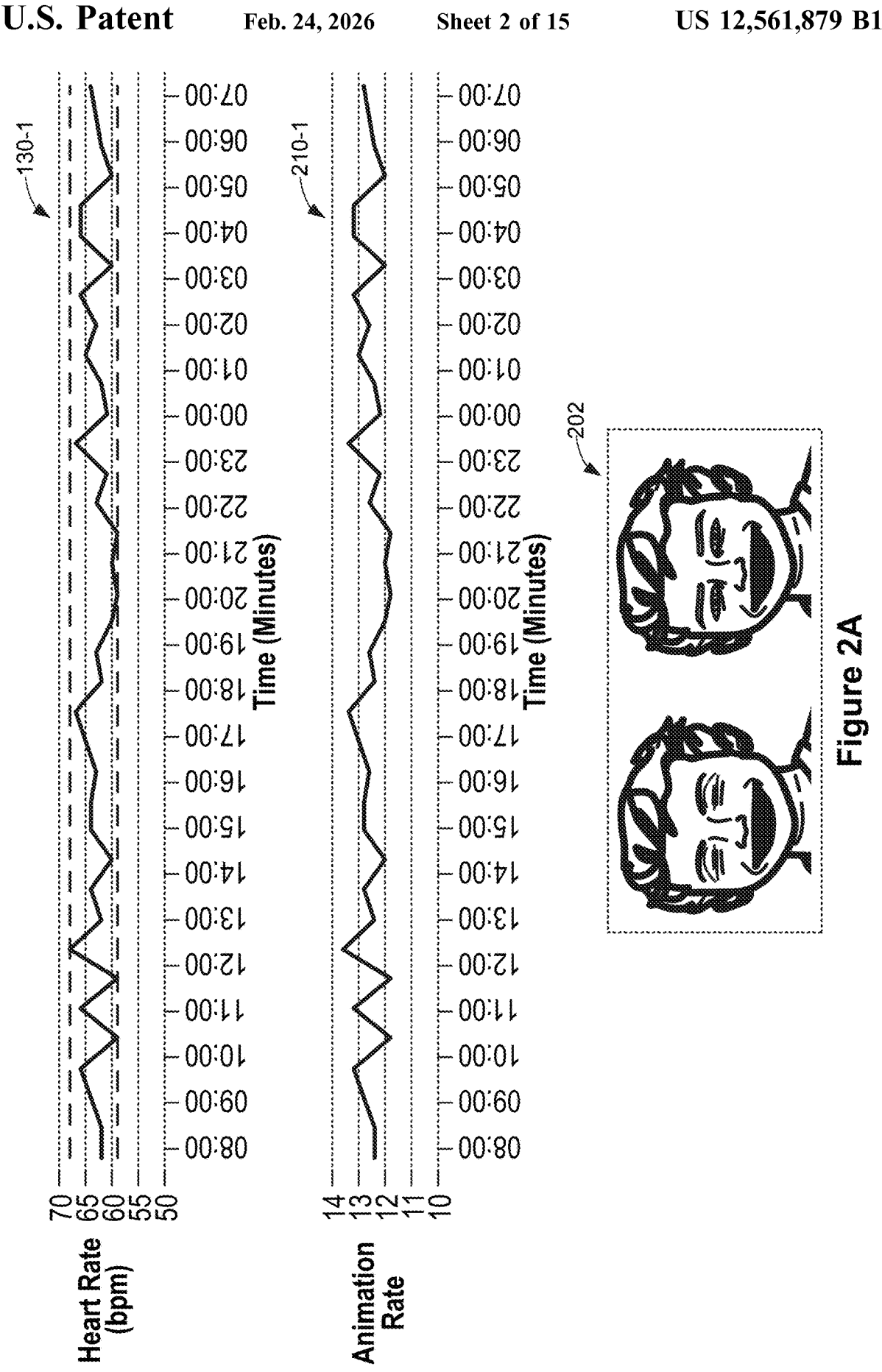
FIGS. 2A-2G provide various examples of animating an avatar using biometric data in accordance with some implementations.

FIG. 2A provides an example where the received biometric data 130 that is requested and received by the authentication module is heart rate information 130-1 (also referred to as heart rate data 130-1). In this example, the heart rate data 130-1 is used to authenticate/verify the user 110. As shown, the predefined threshold 162-1 corresponding to heart rate data 130-1 for this user 110 is between 59 and 67, and the received heart rate data 130-1 falls within the predefined threshold 162-1 for the entire duration shown in FIG. 2A (e.g., 180 minutes). In response to the determination that the received heart rate data 130-1 falls within the predefined threshold 162-1, one or more features 156 of the avatar 154 are animated. In this example, the eyes of the avatar 154 are animated to blink in accordance with a determination that the received heart rate data 130-1 falls within the predefined threshold 162-1. In this example, the measured heart rate from the heart rate data 130-1 is used to determine the animation rate 210-1 for animating blinking of the eyes (shown in FIG. 2A as a zoomed-in view 202 of the avatar 154). In this example, blinking of the eyes of the avatar 154 can provide a signal or indication to other users on the virtual platform that the user 110 (and/or the active participation) associated with the avatar 154 is currently verified.

Figure 2B:
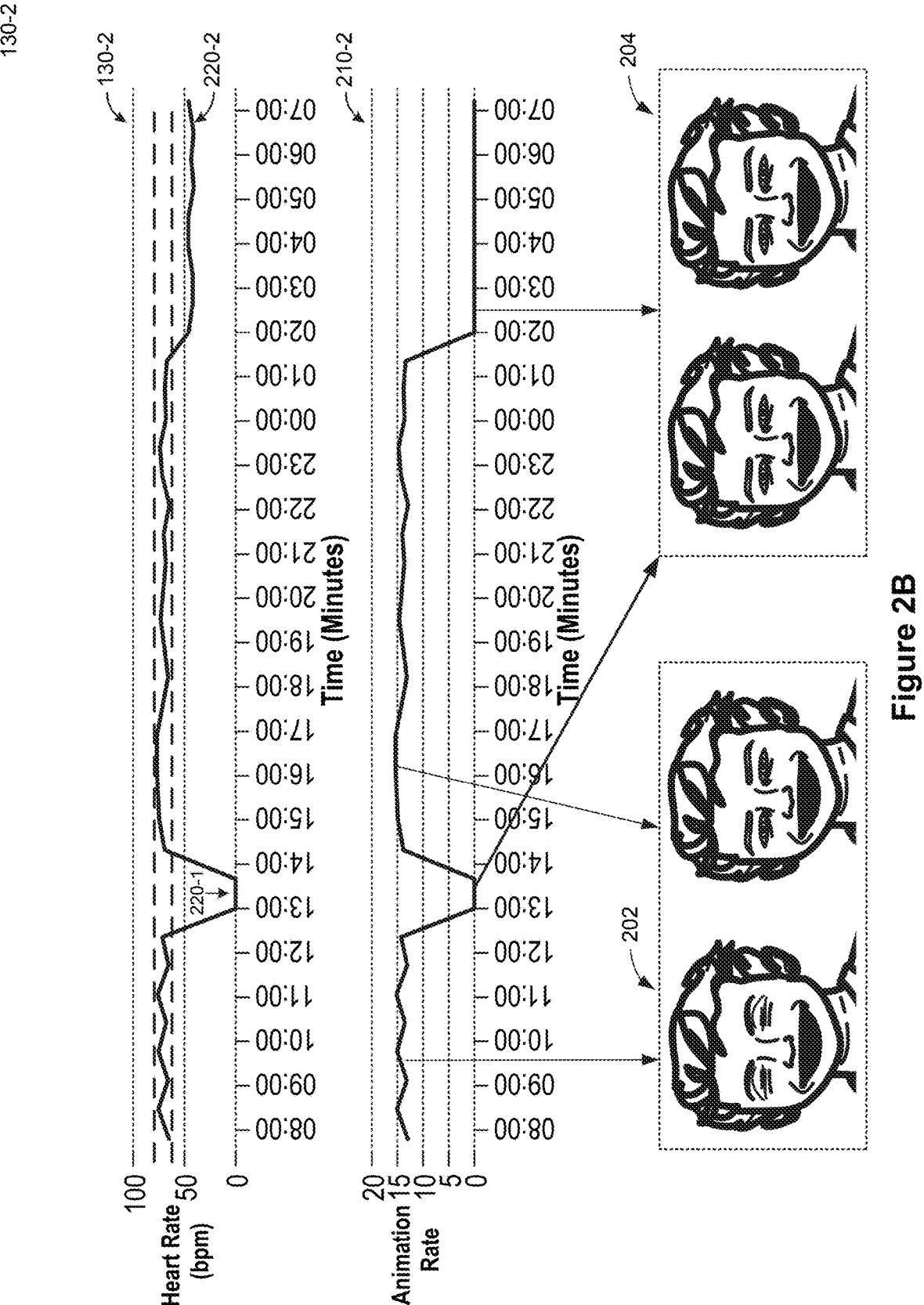

FIG. 2B provides an example where the received biometric data 130 that is requested and received by the authentication module is heart rate information 130-2 (also referred to as heart rate data 130-2). In this example, the heart rate data 130-2 is used to authenticate/verify the user 110. As shown, the predefined threshold 162-2 corresponding to heart rate data 130-2 for this user 110 is between 59 and 67, and the received heart rate data 130-2 falls within the predefined threshold 162-2 for some of the duration shown in FIG. 2B. In some portions (e.g., a first portion 220-1 and a second portion 220-2) of the received heart rate data 130-2, the measured heart rate goes down to zero or falls outside the predefined threshold 162. For example, the first portion 220-1 may correspond to a transmission gap (e.g., due to loss of connection between the authentication module and the device 170, or the user 110 momentarily removed the device 170, or the device 170 was not able to capture the biometric information). In another example, the second portion 220-2 may correspond to the user 110 falling asleep. As shown, when the heart rate data 130-2 falls out of the predefined threshold 162-1 (in this case, drops below 59 bpm), animation of the avatar's eyes blinking stops (e.g., eyes closed or eyes open), illustrated by the animation rate dropping to zero. In this example, blinking (202) of the eyes of the avatar 154 provides a signal or indication to other users on the virtual platform that the user 110 (and/or the active participation) associated with the avatar 154 is currently verified, and no animation of the avatar's eyes (e.g., eyes not blinking, shown in FIG. 2B as a zoomed-in view 204 of the avatar 154) provides a signal or indication to other users on the virtual platform that the user 110 (and/or the active participation) associated with the avatar 154 is currently not verified. For example, for the time frame corresponding to a second portion 220-2 (e.g., ~1:30 onwards), the user 110 may have fallen asleep and thus cannot be considered an active participant on the virtual platform. In this example, the measured heart rate from the heart rate data 130-2 is used to determine the animation rate 210-2 for animating blinking of the eyes (shown in FIG. 2B as a zoomed-in view 202 of the avatar 154) during time frames where the heart rate data 130-1 falls within the predefined threshold 162-1.

In addition to authentication and measuring engagement with a virtual platform, some implementations utilize biometric data to limit unacceptable or inappropriate behavior, making the virtual environment safer. For example, some implementations cut off access for a user if biometric data is outside of an expected range (e.g., blood pressure or heart rate too high).

Figure 2C:
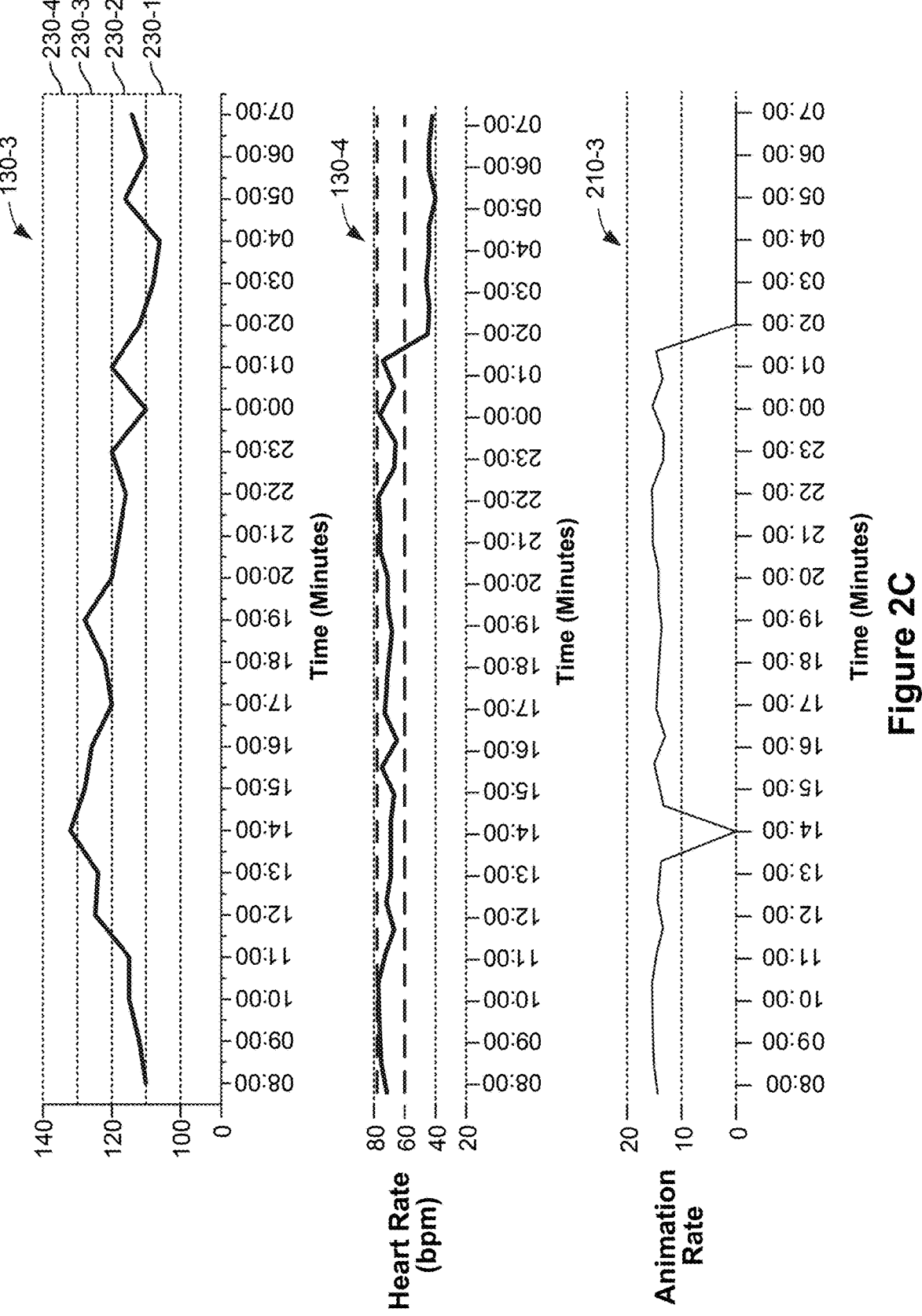

FIG. 2C provides an example where the authentication module requests and receives multiple types of biometric data. In this example, the received biometric data 130 includes systolic blood pressure data 130-3 and heart rate data 130-4. In the example shown both blood pressure data 130-3 and heart rate data 130-4 are used for authenticating the identity or active participation of the user 110 so that both blood pressure data 130-3 and heart rate data 130-4 are required to be within their respective predefined thresholds for the user 110 to be considered verified (e.g., if either the blood pressure data 130-3 or the heart rate data 130-4 falls outside the respective predefined threshold, the user 110 falls out of "authenticated" status). In this example, even though both blood pressure data 130-3 and heart rate data 130-4 are used for authentication, only the heart rate data 130-4 is used for animating one or more features 156 of the avatar 154 associated with the user 110. In this example, the blood pressure data 130-3 is considered to be within the predefined threshold when the measured blood pressure falls within range 230-2 and 230-3 (e.g., is between 110 mmHg- 130 mmHg), and the heart rate data 130-4 is considered to be within the predefined threshold when the measured heart rate is between 60 bpm and 79 bpm. Thus, the avatar's eye blinking is animated when both the blood pressure data 130-3 and heart rate data 130-4 are within their respective predefined thresholds, and the avatar's eye blinking rate is determined based on (e.g., is derived from, calculated from, or corresponds to the same rate as) the heart rate data 130-4. As shown, the animation rate 210-3 for eye blinking of the avatar 154 follows the heart rate data 130-4 except for the portions of time where at least one of the blood pressure 130-3 and the heart rate data 130-4 falls out of the respective predefined thresholds.

Figure 2D:
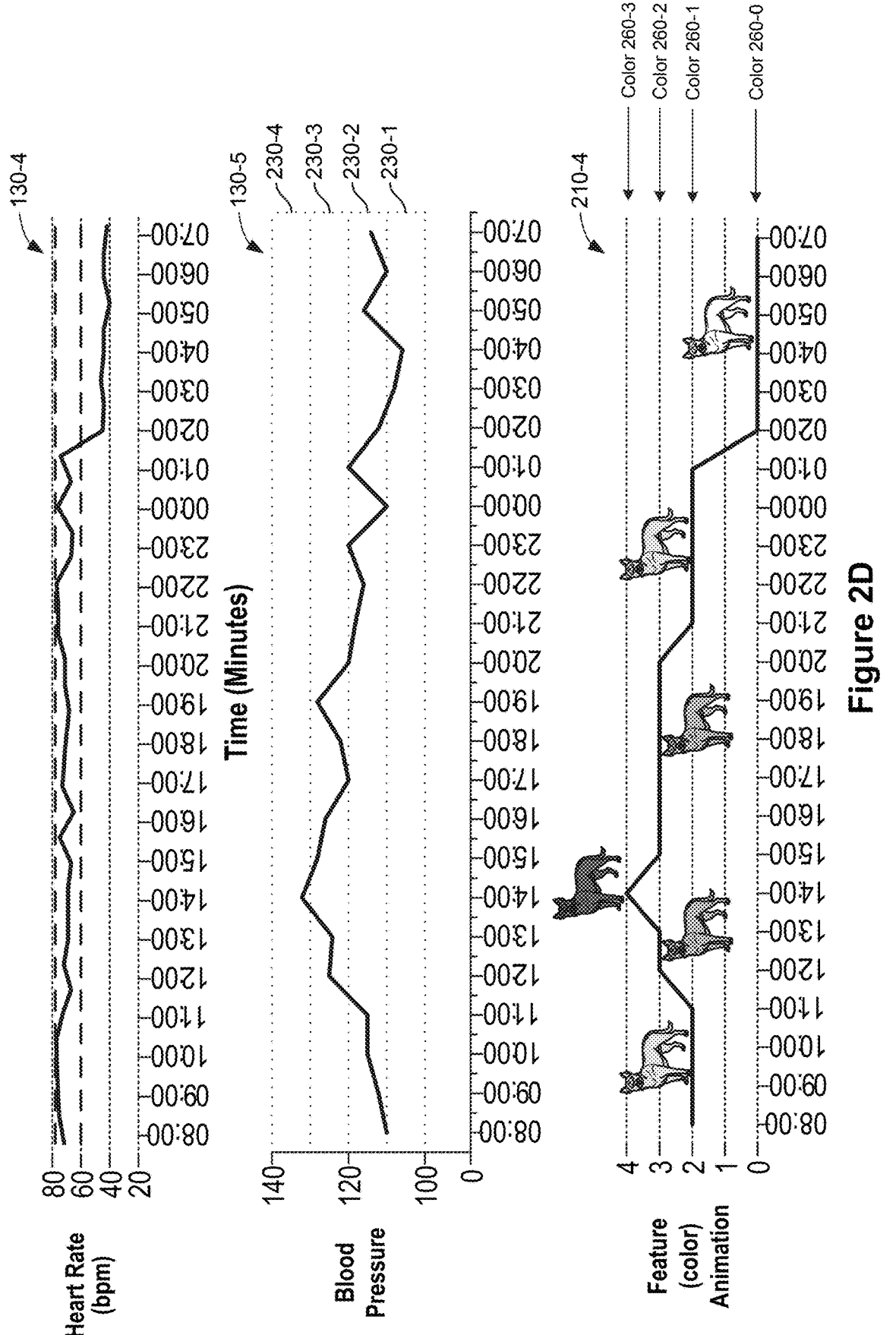

FIG. 2D provides an example where the authentication module requests and receives multiple types of biometric data. In this example, the received biometric data 130 includes heart rate data 130-4 and systolic blood pressure data 130-5, where the heart rate data 130-4 is used for authenticating the identity or active participation of the user 110 and the blood pressure data 130-5 is for determining details regarding animation of the avatar's feature(s). As shown, when the blood pressure data 130-4 is within the predefined threshold (e.g., between 60 bpm and 79 bpm in this example), the avatar animation 210-4 animates (e.g., changes) the skin color of the avatar 154 (shown in FIG. 2D as a dog) based on the blood pressure data 130-5. The avatar 154 is animated to have: (i) a neutral/default skin color 260-0 when the blood pressure data 130-5 is in the first range 230-1, (ii) a first skin color 260-1 when the blood pressure data 130-5 is in the second range 230-2, (iii) a second skin color 260-2 when the blood pressure data 130-5 is in the third range 230-3, and (iv) a third skin color 260-3 when the blood pressure data 130-5 is in the fourth range 230-4. In contrast, when the heart rate data 130-4 falls out of the predefined threshold, the avatar's skin color is changed (e.g., animated) to a neutral color 260-0 (e.g., a base color for the avatar 154, such as beige, brown, white, black, or grey). For example, avatar 154 is a brown dog. Thus, the avatar 154 is animated to have a brown color when the blood pressure data 130-4 is outside the predefined threshold, and the avatar 154 is animated to have other colors (e.g., red, green, blue, yellow, or pink) based on (e.g., in accordance with) the blood pressure data 130-5 when the blood pressure data 130-5 is within the predefined threshold. In another example where the avatar 154 that is a dog, the avatar 154 may be animated to have a color that is an unnatural dog color (e.g., purple) when the heart rate data 130-4 is outside the predefined threshold, and the avatar 154 is animated to have a natural dog color (e.g., brown, black, or white) based on (e.g., in accordance with) the blood pressure data 130-5 when the heart rate data 130-4 is within the predefined threshold.

For example, for an avatar 154 that is a grey rhinoceros, the avatar 154 is animated to have a grey color when the heart rate data 130-4 is outside the predefined threshold, and the avatar 154 may be animated to have some other color (e.g., red, green, blue, yellow, or pink) based on (e.g., in accordance with) the blood pressure data 130-5 when the blood pressure data 130-4 is within the predefined threshold.

Figure 2E:
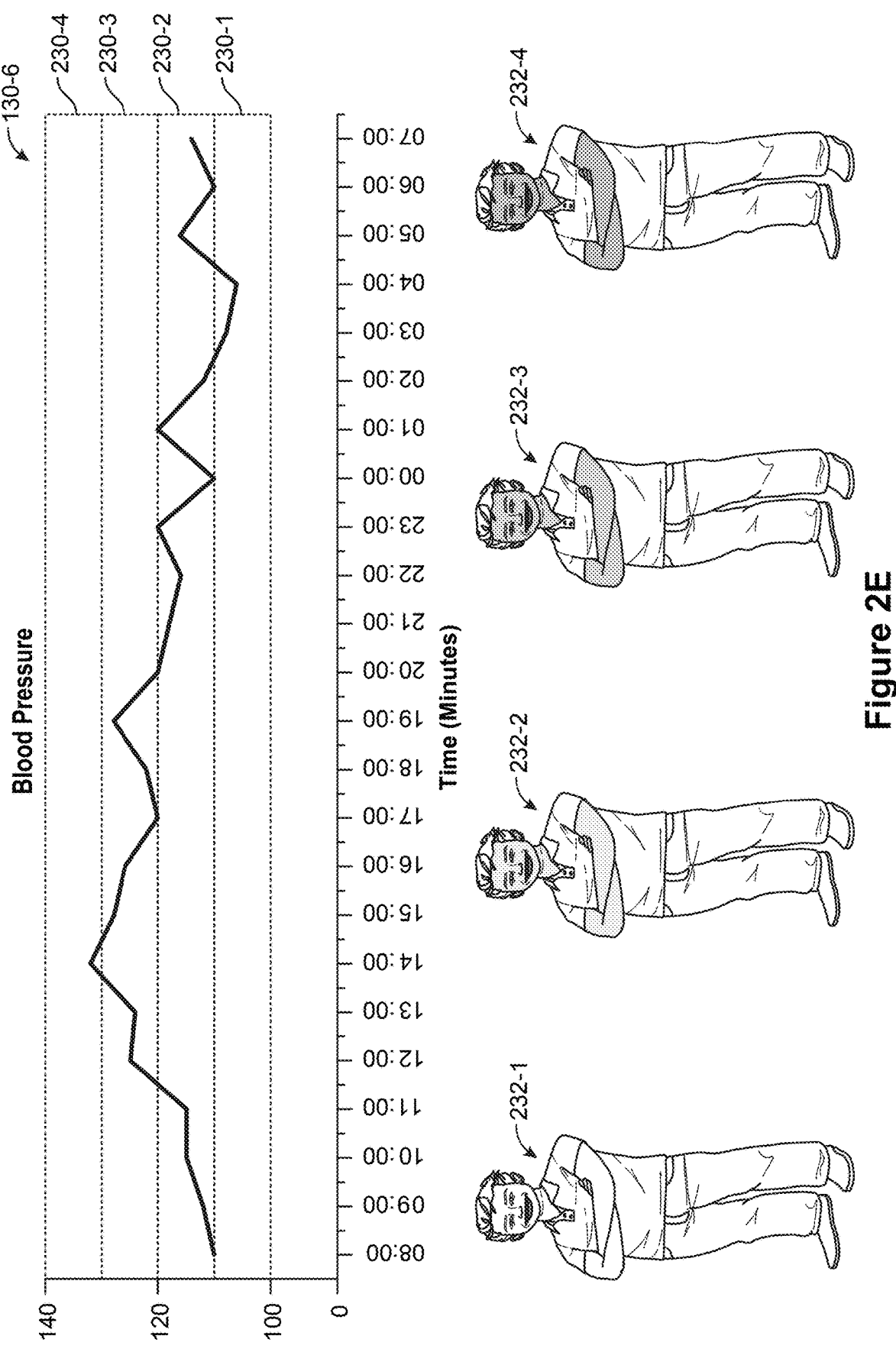

FIG. 2E provides an example where the received biometric data 130 that is requested and received by the authentication module is blood pressure information 130-6 (also referred to as blood pressure data 130-6). In this example, the blood pressure data 130-6 corresponds to systolic blood pressure measured for the user 110 and is used to authenticate/verify the user 110. In this example, the cheek color of the avatar 154 is animated (e.g., changes) in accordance with the blood pressure data 130-6 for the user 110. Changes in the avatar's cheek color can be a step-wise (e.g., discrete) change or a gradual change (e.g., creating an ombre effect over time). Changes to the avatar's cheek color can include hue (e.g., red versus blue), saturation (e.g., hot pink versus pastel pink), and/or brightness (e.g., bold bright red versus a dull red) of the color. In this example, the avatar's cheeks are animated to be a first color 232-1 (e.g., blue) when the user's blood pressure is in a first range 230-1 (e.g., between 100 millimeters of mercury (mmHg) and 110 mmHg), a second color 232-2 (e.g., pink) when the user's blood pressure is in a second range 230-2 (e.g., between 110 mmHg and 120 mmHg, a third color 232-3 (e.g., orange) when the user's blood pressure is in a third range 230-3 (e.g., between 120 mmHg and 130 mmHg), and a fourth color 232-4 (e.g., red) when the user's blood pressure is in a fourth range 230-4 (e.g., between 130 mmHg and 140 mmHg). For example, between 8:00 and 11:30, between 20:00 and 2:15, and between 4:30 and 6:00, the user's systolic blood pressure is in the second range 230-2, so the avatar 154 associated with the user 110 is animated so that its checks are the second color 232-2 during those times. In some implementations, when the authentication module does not receive any blood pressure data 130-6, the cheeks are a neutral color that matches the skin tone of the avatar 154 (e.g., if the avatar 154 is a green dragon, then the cheeks are animated as being a green color that matches the rest of the green dragon body). The color of the avatar's cheeks can provide a signal or indication to other users on the virtual platform regarding a status of the user 110. In the example illustrated, the arms of the avatar are also animated by the same color as the avatar's cheeks.

In another example, the checks of the avatar 154 are animated to having a glowing effect (e.g., radiate or pulsate) based on the blood pressure data 130-6. For example, the checks of the avatar may be animated as glowing or radiating by a small amount (e.g., via a small halo) or pulsate at a slow fixed rate when the blood pressure data 130-6 indicates that the user's blood pressure is in the first range 230-1. The checks of the avatar may be animated as glowing or radiating by a larger amount (e.g., via a larger halo) or pulsate at a faster fixed rate when the blood pressure data 130-6 indicates that the user's blood pressure is in the fourth range 230-4.

In some implementations, the blood pressure data 130-6 is used to authenticate the user 110 by comparing the blood pressure data 130-6 to a predefined threshold for systolic blood pressure for the user 110. In this example, suppose the predefined threshold corresponds to ranges 230-2 and 230-3. In this case, the blood pressure data 130-6 is considered to be out of range if it is below 110 mmHg or above 130 mmHg. Thus, animation of the avatar 154 (e.g., animation of the color of the cheeks of the avatar 154) may cease (e.g., showing a neutral color that blends in with the rest of the avatar's skin color, and/or the cheeks are shown without halo or pulsating effects) during the time intervals 13:50 to 14:10 and 2:30 to 4:30 since the blood pressure data 130-6 falls outside the predefined threshold for blood pressure for the user 110. All of this information can be captured and recorded on the virtual platform.

Figure 2F:
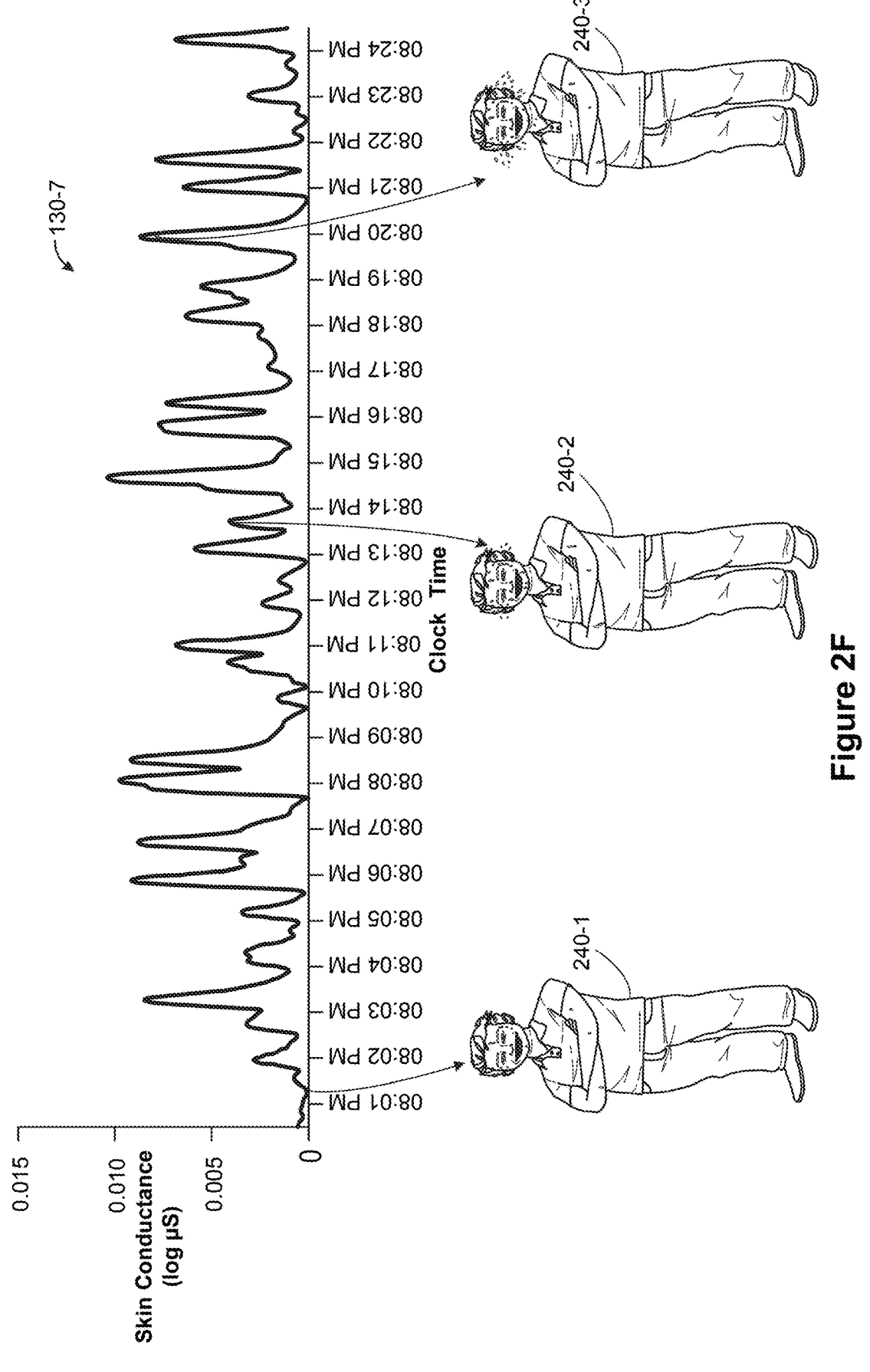

FIG. 2F provides an example, similar to the example shown in FIG. 2E, except that the received biometric data 130 that is requested and received by the authentication module is skin conductance information 130-7 (e.g., electrodermal activity, also referred to as skin conductance data 130-7) and the skin conductance data 130-7 is used to animate the amount of sweat on the avatar 154. In this example, the amount of sweat on the avatar 154 is animated based on the skin conductance data 130-7, where higher skin conductance corresponds to the avatar 154 being animated to show more sweat. In some implementations, the amount of sweat on the avatar 154 is gradually increased or decreased. In some implementations, the amount of sweat on the avatar 154 is incrementally increased or decreased (e.g., by discrete amounts). In some implementations, such as when skin conductance data is not available, the avatar 154 is animated with no sweat. In this example, the presence of sweat on the avatar 154 can provide a signal or indication to other users on the virtual platform regarding the status of the user 110.

In some implementations, the skin conductance information 130-7 is associated with a predefined threshold, so it can be used for authentication purposes.

Figure 2G:
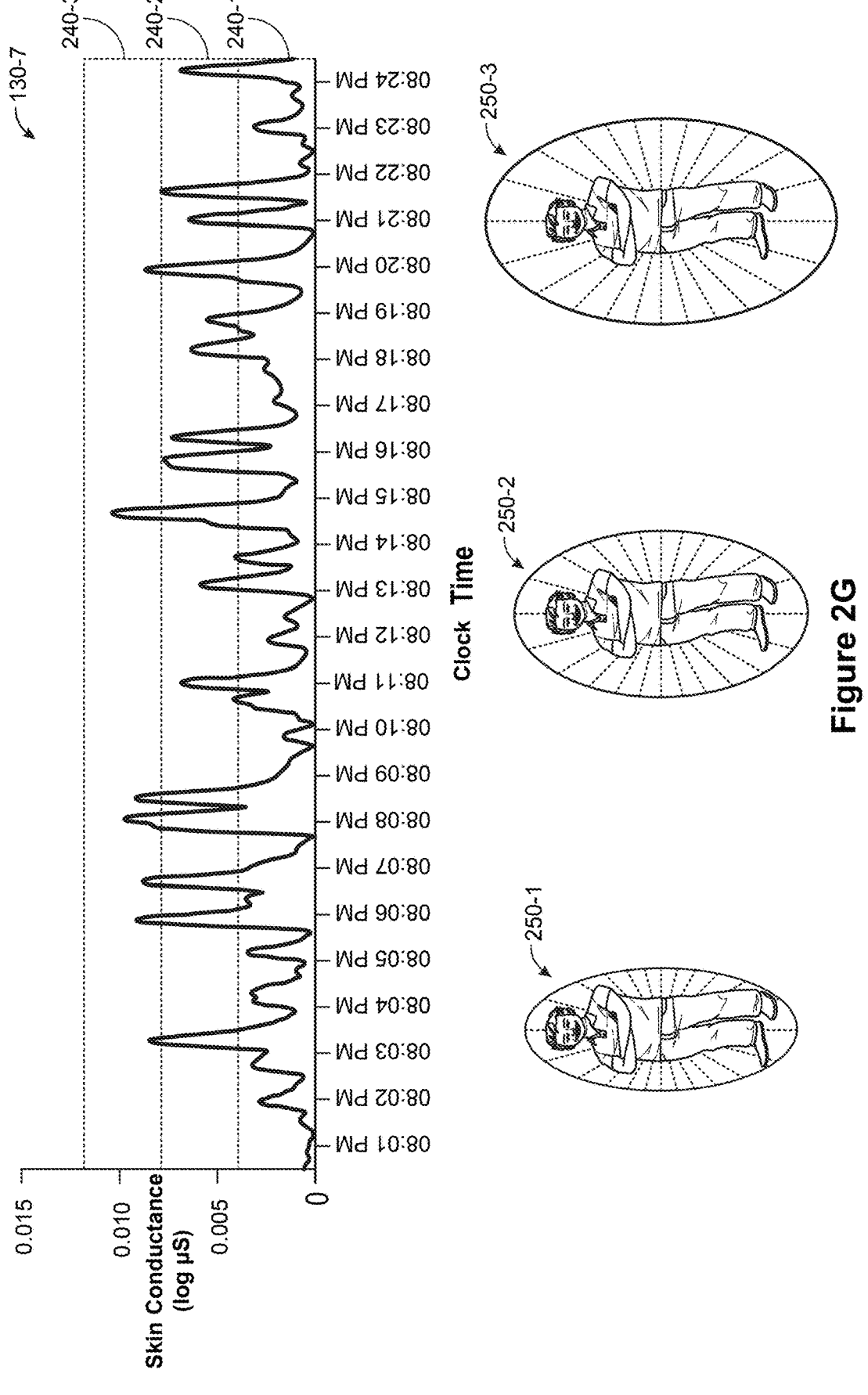
Figure 4B:
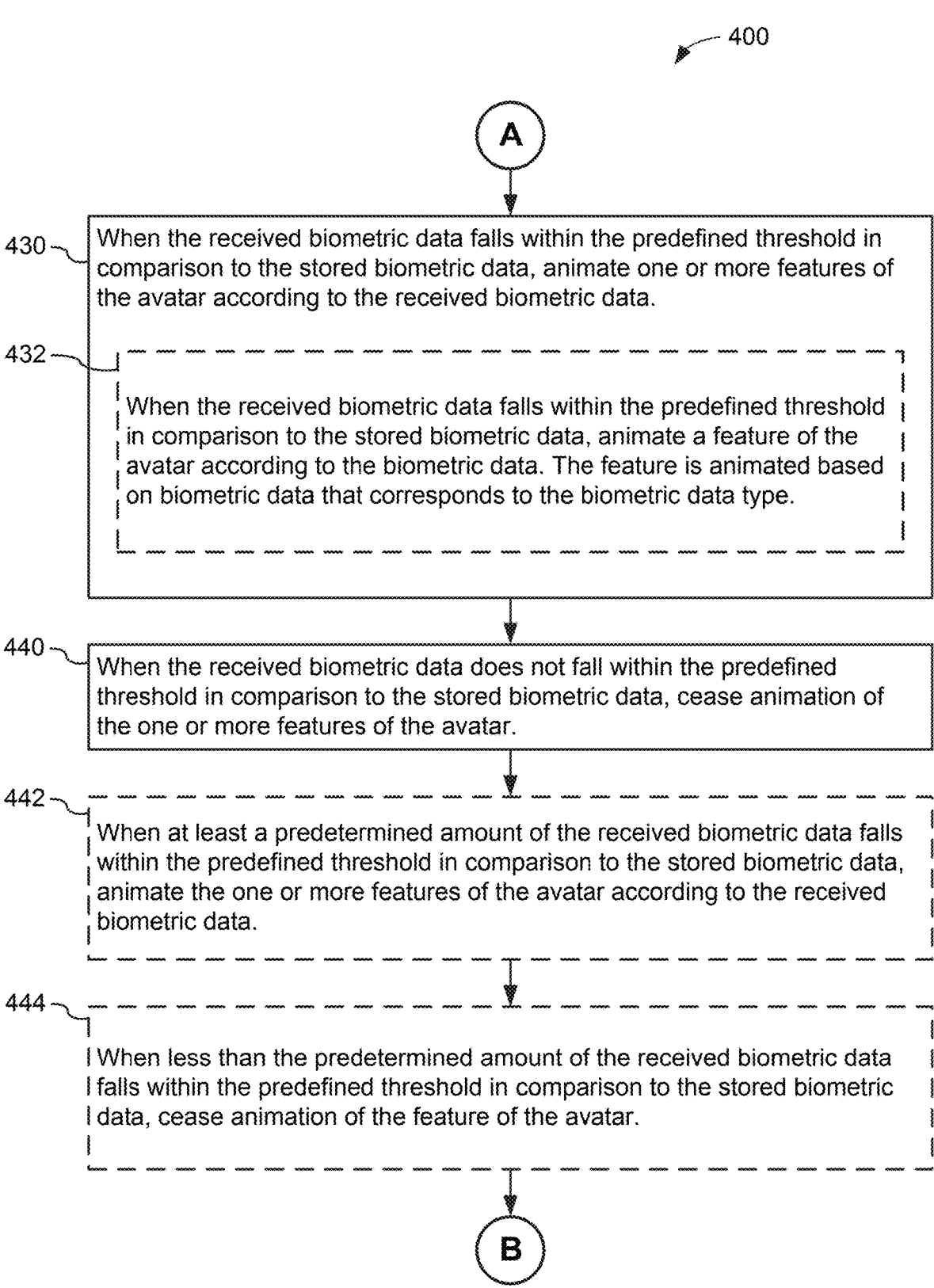
Figure 4E:
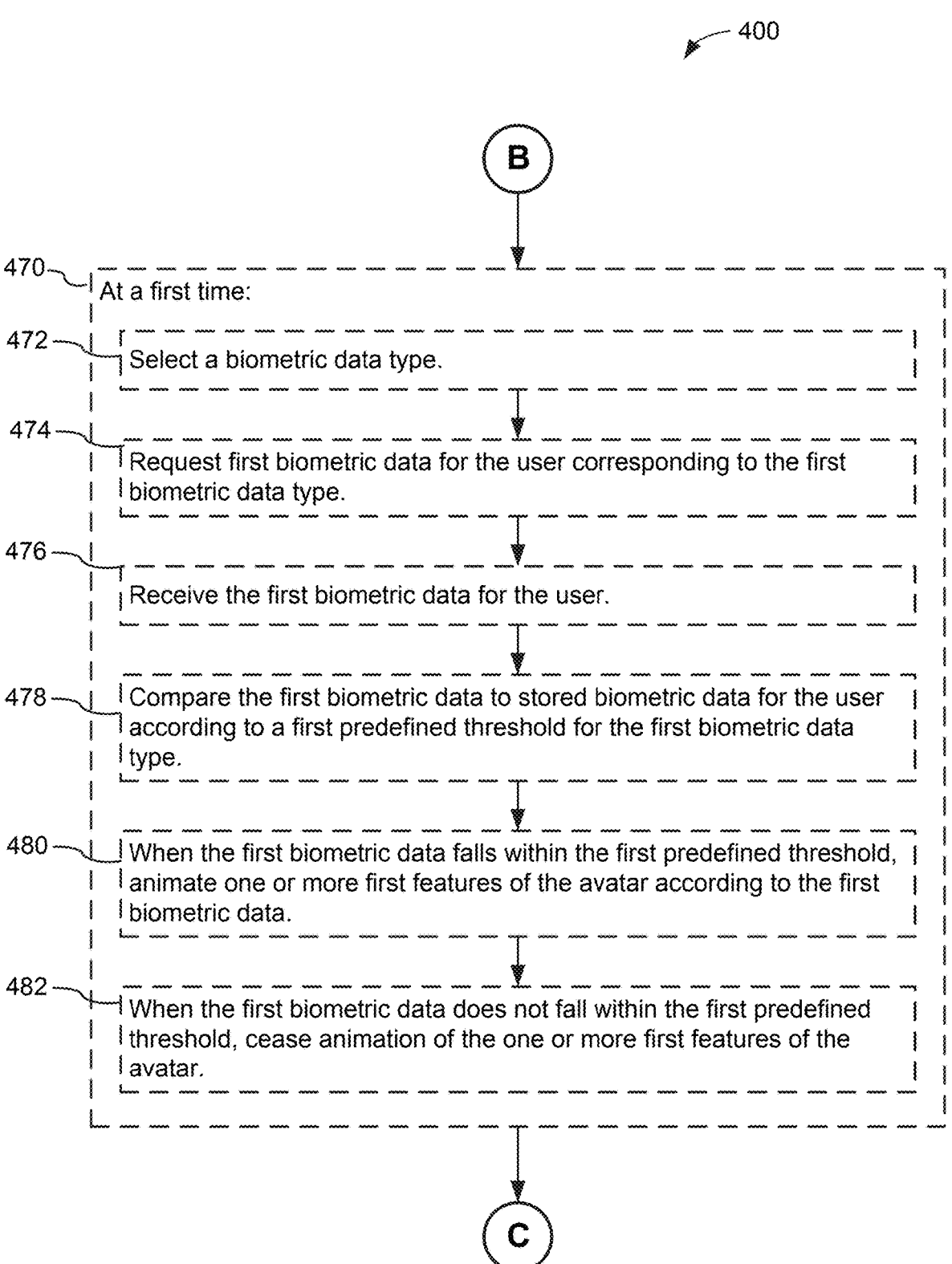

FIG. 2G provides an example where the skin conductance data 130-7 falls into one of a plurality of ranges 240-1, 240-2, and 240-3 based on the measured skin conductance value. In this example, an aura (e.g., halo) is animated for the avatar 154 based on the skin conductance data 130-7, where low skin conductance (e.g., skin conductance falling in the first range 240-1) corresponds to a small aura 250-1 (e.g., a small halo or glow animated around the avatar 154), medium skin conductance (e.g., skin conductance falling in the second range 240-2) corresponds to a medium sized aura 250-2 (e.g., a medium sized halo or glow animated around the avatar 154), and high skin conductance (e.g., skin conductance falling in the third range 240-3) corresponds to a large aura 250-3 (e.g., a large halo or glow animated around the avatar 154).

In some implementations, the biometric data 130 is used to animate one or more features 156 of the avatar 154 regardless of whether the biometric data 130 (e.g., blood pressure 130-6 or skin conductance 130-7) is used in an authentication process.

In some implementations, animation of the one or more features 156 of the avatar 154 is animated based on two or more received types of biometric data. For example, if the received biometric data 130 includes skin conductance data 130-7 and heart rate data (such as the heart rate data 130-2 shown in FIG. 2B), the aura or halo can also be animated to pulsate or radiate at a rate corresponding the to the heart rate data.

Examples of biometric data types include heart rate (e.g., pulse rate), heart rate variable (e.g., interval between heart beats), blood pressure, electrocardiogram (EKG or ECG), electroencephalogram (EEG), skin conductance (including electrodermal activity (EDA) and galvanic skin response (GSR)), brain states (e.g., brain waves, including alpha states, beta states, delta states), hormone levels, gait, eye movement, blinking rate, and fingerprints.

Examples of animating one or more features 156 of the avatar 154 include animating swaying, smiling, facial expressions, twitching, appendage tapping, clapping, nail biting, mouth puckering, car-twitching, vibrating (e.g., body hum), eyelash flutter, twitching, winking, leg-crossing/appendage-crossing, shrugging, visible breathing (such as breaths, heaves, and/or gasps), waving (e.g., arm waving, hand waving, leg waving, foot waving, and/or tail wagging), growing of skin and/or dermal appendages (such as growth of head hair, facial hair, feathers, and/or fur), growing of guest species (e.g., lichen, moss, or mold growing on portions of the avatar 154 where the avatar 154 acts as a host for such guest species), crawling of insects on the avatar 154 (e.g., an ant or a spider crawling on the avatar 154), wind effects (e.g., a breeze), perceived torsion (e.g., twisting or turning), hair or skin rising (e.g., goosebumps or hackles), visible heart-thumping, finger-snapping, twirling hair/moustache/beard, pulsing/pulsating, auras or halos, movement of clothes, tail wagging, interaction with an accessory or object that is part of the avatar 154 (such as playing with a yo-yo or baton, pen clicking, taking glasses on/off, taking headwear on/off), changes to skin or epidermal structure of the avatar 154 (such as texture, color, shape), and/or nonfunctional actions (such as clapping, jumping jacks, running in place, or sweating).

One of ordinary skill in the art can understand that the biometric data types and animation options provided above are examples and implementation of the methods and systems described herein are not limited to the listed examples. Additionally, various biometric data types and animation options can be combined without limit beyond the combinations explicitly described herein.

FIG. 3 is a block diagram of a computing device 300 in accordance with some implementations. Various examples of the computing device 300 include a server, a virtual machine, a desktop computer, a laptop computer, a tablet computer, and other computing devices (e.g., IT or OT devices) that have a processor capable of running a virtual platform application 320. The computing device 300 typically includes one or more processing units/cores (CPUs) 302 for executing modules, programs, and/or instructions stored in the memory 314 and thereby performing processing operations; one or more network or other communications interfaces 304; memory 314; and one or more communication buses 312 for interconnecting these components. The communication buses 312 may include circuitry that interconnects and controls communications between system components.

In some implementations, the computing device 300 includes a user interface 306 comprising a display device 308 and one or more input devices or mechanisms 310. In some implementations, the input device/mechanism includes a keyboard. In some implementations, the input device/mechanism includes a "soft" keyboard, which is displayed as needed on the display device 308, enabling a user to "press keys" that appear on the display 308. In some implementations, the display 308 and input device/mechanism 310 comprise a touch screen display (also called a touch sensitive display).

In some implementations, the memory 314 includes high-speed random-access memory, such as DRAM, SRAM, DDR RAM or other random-access solid-state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory devices within the memory 314, comprises a non-transitory computer-readable storage medium. In some implementations, the memory 314, or the computer-readable storage medium of the memory 314, stores the following programs, modules, and data structures, or a subset thereof:

an operating system 316, which includes procedures for handling various basic system services and for performing hardware dependent tasks;

a communications module 318, which is used for connecting the computing device 300 to other computers (e.g., to the computer 120) and devices (e.g., the device 170) via the one or more communication network interfaces 304 (wired or wireless) and one or more communication networks, such as the Internet, other wide area networks, local area networks, metropolitan area networks, and so on;

a virtual platform application 320 (also referred to herein as a virtual platform), which generates a simulated virtual environment that allows multiple participants to interact within the virtual environment and with one another. Examples of virtual platform applications 320 include social media networks, dating applications, web conferencing applications, and multi-player games. The virtual platform application 320 includes one or more of:

an authentication module 322, which compares received biometric data 130 to information regarding reference biometric data 160 that is stored as part of a user profile 150. In some implementations, comparing the received biometric data 130 to information regarding reference biometric data 160 includes comparing the received biometric data 130 to a corresponding predefined threshold 162 for the same biometric data type;

an avatar animation module 324, which animates one or more defined features 156 of an avatar 154 representing a user 110 on the virtual platform 320;

an activity verification module 326, which uses biometric data 130 to verify whether a user 110 is actively participating in an interaction or activity on the virtual platform 320. In some implementations, the activity verification module 326 uses the authentication module 322 to authenticate a user's identity and/or that a user 110 is currently active;

a biometric selection module 328, which allows a user 110 to provide and select which types of biometric data the virtual platform application 320 and/or the authentication module 322 is allowed to access, request, and/or use for authentication and verification purposes. In some implementations, the biometric selection module 328 allows the virtual platform application 320 and/or the authentication module 322 to perform ad hoc selection of the type of biometric data (from the pre-defined allowed types of biometric data, as defined by the user) for authentication and verification purposes. This allows an added dimension of randomness/unpredictability in biometric data authentication while still allowing users to maintain control of what types of biometric data they are willing to share; and one or more databases 340, which are used by the virtual platform application 320. The one or more databases 340 include a user profile 150 (which includes reference biometric data 160), avatar preferences 346, and a user activity log 348, described in more detail above with reference to FIG. 1.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above (e.g., the virtual platform application 320 may not include the authentication module 324). Furthermore, the memory 314 may store additional modules or data structures not described above (e.g., the virtual platform application 320 further includes a reward determination module).

Although FIG. 3 shows a computing device 300, FIG. 3 is intended more as a functional description of the various features that may be present rather than as a structural schematic of the implementations described herein. In practice, and as recognized by those of ordinary skill in the art, items shown separately could be combined and some items could be separated.

FIGS. 4A-4F provide a flowchart of a method 400 for authenticating user participation in a virtual environment (e.g., the virtual platform application 320), such as a multi-user platform, in accordance with some implementations. The method 400 is performed at a computing system 300 having one or more processors and memory. In some implementations, the memory stores one or more programs configured for execution by the one or more processors.

The method 400 includes receiving (step 410) biometric data 130 for a user 110 and comparing (step 420) the received biometric data 130 to stored biometric data 160 (e.g., the reference biometric data 160 that is stored as part of user profile 150) for the user 110 according to a predefined threshold 162. The method 400 also includes, when the received biometric data 130 falls within the predefined threshold 162 in comparison to the stored biometric data 160, animating (step 430) one or more defined features 156 of the avatar 154 according to the received biometric data 160. The method 400 further includes, when the received biometric data 130 does not fall within the predefined threshold 162 in comparison to the stored biometric data 160, ceasing (step 440) animation of the one or more defined features of the avatar.

In some implementations, the method 400 further includes selecting (step 406) one or more features 156 of the avatar 154 from a plurality of predefined features for the avatar and selecting (step 408) one or more biometric data types from a plurality of user approved biometric data types for animating the selected one or more defined features 156 of the avatar 154. The multi-user platform (e.g., virtual platform application 320) is authorized to request biometric data 130 corresponding to any of the plurality of user approved biometric data types. The predefined threshold 162 is defined based on the biometric data type.

In some implementations, the method 400 also includes receiving (step 412) biometric data corresponding to a plurality of biometric data types. The plurality of biometric data types includes at least a first biometric data type and a second biometric data type that is different from the first biometric data type. The method 400 further includes comparing (step 422) the received biometric data to stored biometric data that corresponds to the same biometric data type as the respective received biometric data according to a respective predefined threshold for the respective biometric data type. Examples are provided above with respect to FIGS. 2A-2G.

In some implementations, the received biometric data 130 has a biometric feature that changes over time. In some implementations, the method 400 further includes extracting (step 424) the feature from the received biometric data 130. The one or more features 156 of the avatar 154 are animated in accordance with changes in the biometric feature over time. Examples are provided above with respect to FIGS. 2A-2G. For example, as shown in FIG. 2A, the avatar's rate of eye blinking is animated in accordance with the pulse rate in the heart rate data 130-1. In another example, the avatar's rate of eye blinking is animated in accordance with a change in the pulse rate in the heart rate data 130-1 (e.g., the slope of the heart rate data 130-1).

In some implementations, the method 400 also includes, when the received biometric data 130 falls within the predefined threshold 162 in comparison to the stored biometric data 160, animating (step 432) a feature of the avatar 154 according to the biometric data 130. A feature is animated based on the biometric data 130 corresponding to a respective biometric data type. Examples are provided above with respect to FIGS. 2A-2G.

In some implementations, the method 400 further includes, when at least a predetermined amount of the received biometric data 130 falls within the predefined threshold 162 in comparison to the stored biometric data 160, animating (step 442) the one or more features 156 of the avatar 154 according to the received biometric data 130. Examples are provided above with respect to FIGS. 2A-2G.

In some implementations, the method 400 also includes, when less than the predetermined amount of the received biometric data 130 falls within the predefined threshold 162 in comparison to the stored biometric data 160, ceasing (step 444) animation of the feature 156 of the avatar 154. Examples are provided above with respect to FIGS. 2A-2G.

In some implementations, the method 400 further includes monitoring (step 450) activity of the user 110. The method 400 also includes, when the received biometric data 130 falls within the predefined threshold 162 in comparison to the stored biometric data 160, determining (step 452) that the user 110 is actively participating in the multi-user platform. The method 400 further includes, when the received biometric data 130 falls outside the predefined threshold 162 in comparison to the stored biometric data 160, determining (step 454) that the user 110 is not actively participating in the multi-user platform.

In some implementations, the method 400 further includes, when the user 110 is actively participating in the multi-user platform during a time period, determining (step 453) that the user 110 is eligible for compensation for interactions of the avatar 154 in the multi-user platform during the time period. The method 400 also includes, when the user is not actively participating in the multi-user platform during the time period, determining (step 455) that the user 110 is not eligible for compensation for interactions of the avatar 154 in the multi-user platform during the time period. For example, if the avatar 154 is part of a team that is supposed to be collaborating to complete an objective (e.g., a team of gamers competing against another team), the user 110 corresponding to the avatar 154 may have walked away from the computer and thus, was not actively participating in the competition. If a biometric sensor is embedded in a controller (e.g., a mouse, a joystick, or a gaming controller) and the user 110 is no longer holding the controller, the authentication module will receive a transmission gap in the biometric data and thus, may determine that the user 110 was not an active participant during the competition and thus, prevent the user 110 from gaining un-earned experience points. In another example, during a vote on a proposed plan of action during a work meeting, the authentication module may require authentication from the user 110 (e.g., fingerprint authentication at a fingerprint sensor) to confirm that the user 110 is consenting to the recorded choice selection.

In some implementations, the method 400 further includes, when the received biometric data 130 does not fall within the predefined threshold 162 in comparison to the stored biometric data 160 for more than a prespecified amount of time, disabling (step 456) the avatar's ability to interact with an environment in the multi-user platform.

In some implementations, the method 400 also includes, upon identifying a transmission gap that is greater than a threshold time while receiving the biometric data 130, ceasing (step 458) animation of the one or more defined features 156 of the avatar 154.

In some implementations, the method 400 further includes, in response (step 460) to a request to access information restricted to the user 110, comparing (step 462) the received biometric data 130 to the stored biometric data 160 for the user 110 according to a predefined threshold 162 for the corresponding biometric data type. The method 400 also includes, when the received biometric data 130 falls within the predefined threshold 162 in comparison to the stored biometric data 130, granting (step 464) access to the information restricted to the user 110.

In some implementations, the method 400 also includes, in response to a determination that the received biometric data 130 falls outside the predefined threshold 162 in comparison to the stored biometric data 130, denying or revoking access to the information restricted to the user 110.

In some implementations, the method 400 also includes, at a first time (step 470), selecting (step 472) a biometric data type, requesting (step 474) first biometric data for the user 110 corresponding to the first biometric data type, receiving (step 476) the first biometric data for the user 110, and comparing (step 478) the first biometric data to stored biometric data (e.g., the reference biometric data 160-1) for the user 110 according to a first predefined threshold (e.g., predefined threshold 162-1) for the first biometric data type. The method 400 further includes, when the first biometric data falls within the first predefined threshold 162-1, animating (step 480) one or more first features (e.g., the feature 156-1) of the avatar 154 according to the first biometric data. The method 400 also includes, when the first biometric data does not fall within the first predefined threshold, ceasing (step 482) animation of the one or more first features of the avatar 154. The method 400 further includes, at a second time (step 484) that is distinct from the first time: selecting (step 486) a second biometric data type that is different from the first biometric data type; requesting (step 488) second biometric data for the user 110 corresponding to the second biometric data type; receiving (step 490) the second biometric data, corresponding to the second biometric data type, for the user 110; and comparing (step 492) the second biometric data to stored biometric data (e.g., the reference biometric data 160-2) for the user 110 according to a second predefined threshold (e.g., the predefined threshold 162-2) for the second biometric data type. The method 400 also includes, when the second biometric data falls within the second predefined threshold 162-2, animating (step 494) one or more second features (e.g., the feature 156-2) of the avatar 154 according to the second biometric data. The method 400 further includes, when the second biometric data does not fall within the second predefined threshold, ceasing (step 496) animation of the one or more second features 156-2 of the avatar 154. For example, heart rate data and blood pressure data can both be used for authentication purposes following the methods described above. Additionally, the heart rate data can be used for animating blinking of the avatar's eyes while the blood pressure data is used for animating skin color changes for the avatar 154.

In some implementations, the multi-user platform is configured to allow real-time interaction between users via avatar representation, and animation of the one or more features 156 of the avatar 154 provides, in real-time, an indication to other users of the multi-user platform, that the user 110 is actively engaged on the multi-user platform.

In some implementations, animating the one or more features 156 of the avatar 154 according to the received biometric data includes animating the one or more features 156 so that the one or more features 156 change dynamically when the received biometric data 130 falls within the predefined threshold 162 in comparison to the stored biometric data 160, and the one or more features are stationary otherwise.

In some implementations, animating the one or more features 156 of the avatar 154 in accordance with changes in the biometric feature over time includes animating the one or more features 156 of the avatar 154 at an animation rate that corresponds to the rate of change of the biometric feature.

In some implementations, the animation rate is based on and different from the rate of change of the biometric feature.

In some implementations, receiving biometric data for the user includes receiving biometric data corresponding to a plurality of biometric data types. The plurality of biometric data types includes at least a first biometric data type and a second biometric data type that is different from the first biometric data type, and comparing the received biometric data to stored biometric data for the user includes comparing received biometric data for each biometric data type to respective stored biometric data corresponding to the same biometric data type according to a respective predefined threshold for the respective biometric data type. An example is provided with respect to FIG. 2C.

In some implementations, the plurality of biometric data types includes first biometric data corresponding to a first biometric data type and second biometric data corresponding to a second biometric data type. The first biometric data is different from the second biometric data, the first biometric data type is different from the second biometric data type, and comparing the received biometric data to stored biometric data for the user according to a predefined threshold includes comparing the first biometric data to stored biometric data corresponding to the first biometric data type according to a first predefined threshold corresponding to the first biometric data type. The one or more features of the avatar are animated based on the second biometric data. An example is provided with respect to FIG. 2C.

In some implementations, the stored biometric data 160 and the predefined threshold 162 are stored in a profile 150 for the user 110. The profile 150 further specifies user selection of the one or more features 156 of the avatar 154 and user selection of one or more biometric data types used to animate the one or more features 156 of the avatar 154.

In some implementations, the one or more features 156 of the avatar 154 are animated according to the received biometric data 130 while accessing the stored biometric data 160 for the user 110 (e.g., in real time or near-real time).

In some implementations, the received biometric data is received at a plurality of predetermined discrete time intervals.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method comprising:
   at a computing device having memory and one or more processors:
      receiving biometric data for a user;
      comparing the received biometric data to stored biometric data for the user according to a predefined threshold;
      in response to a determination that the received biometric data falls within the predefined threshold in comparison to the stored biometric data, animating one or more features of an avatar according to the received biometric data, wherein the avatar is a virtual representation of the user; and
      in response to a determination that the received biometric data does not fall within the predefined threshold in comparison to the stored biometric data, ceasing animation of the one or more features of the avatar.

2. The method of claim 1, wherein:
   the avatar represents the user on a multi-user platform that is configured to allow real-time interaction between users via avatar representation; and
   animation of the one or more features of the avatar provides, in real-time, an indication to other users of the multi-user platform, that the user is actively engaged on the multi-user platform.

3. The method of claim 2, further comprising:
   at the computing device:
      monitoring activity of the user, wherein:
      in response to a determination that the received biometric data falls within the predefined threshold in comparison to the stored biometric data, determining that the user is actively participating in the multi-user platform; and
      in response to a determination that the received biometric data falls outside the predefined threshold in comparison to the stored biometric data, determining that the user is not actively participating in the multi-user platform.

4. The method of claim 3, further comprising:
   at the computing device:
      in response to determination that the user is actively participating in the multi-user platform during a time period, determining that the user is eligible for compensation for interactions of the avatar in the multi-user platform during the time period; and
      in response to a determination the user is not actively participating in the multi-user platform during the time period, determining that the user is not eligible for compensation for interactions of the avatar in the multi-user platform during the time period.

5. The method of claim 1, further comprising:

at the computing device:

selecting one or more features of the avatar from a plurality of predefined features for the avatar; and selecting one or more biometric data types from a plurality of user approved biometric data types for animating the selected one or more features of the avatar, wherein:

the multi-user platform is authorized to request biometric data corresponding to any of the plurality of user approved biometric data types; and the predefined threshold is defined based on the biometric data type.

6. The method of claim 5, further comprising:

at a first time at the computing device:

selecting a biometric data type;

requesting first biometric data, for the user, that corresponds to the first biometric data type;

receiving the first biometric data for the user;

comparing the first biometric data to stored biometric data for the user according to a first predefined threshold for the first biometric data type;

in response to a determination that the first biometric data falls within the first predefined threshold, animating one or more first features of the avatar according to the first biometric data; and in response to a determination that the first biometric data does not fall within the first predefined threshold, ceasing animation of the one or more first features of the avatar; and at a second time distinct from the first time, at the computing device:

selecting a second biometric data type that is different from the first biometric data type;

receiving second biometric data, corresponding to the second biometric data type, for the user;

comparing the second biometric data to stored biometric data for the user according to a second predefined threshold for the second biometric data type;

in response to a determination that the second biometric data falls within the second predefined threshold, animating one or more second features of the avatar according to the second biometric data; and in response to a determination that the second biometric data does not fall within the second predefined threshold, ceasing animation of the one or more second features of the avatar.

7. The method of claim 2, further comprising:

at the computing device:

in response to a determination that the received biometric data does not fall within the predefined threshold in comparison to the stored biometric data for more than a prespecified amount of time, disabling the avatar's ability to interact with an environment in the multi-user platform.

8. The method of claim 1, wherein the received biometric data has a biometric feature that changes over time and the method further comprises:

extracting the biometric feature from the received biometric data; and animating the one or more features of the avatar includes animating the one or more features of the avatar in accordance with changes in the extracted biometric feature over time.

9. The method of claim 8, wherein:

animating the one or more features of the avatar according to the received biometric data includes animating the one or more features so that the one or more features change dynamically when the received biometric data falls within the predefined threshold in comparison to the stored biometric data, and the one or more defined features are stationary otherwise.

10. The method of claim 8, wherein animating the one or more features of the avatar in accordance with changes in the biometric feature over time includes animating the one or more features of the avatar at an animation rate that corresponds to a rate of change of the biometric feature.

11. The method of claim 10, wherein the animation rate is based on and different from the rate of change of the biometric feature.

12. The method of claim 1, wherein:

receiving biometric data for the user includes receiving biometric data corresponding to a plurality of biometric data types;

the plurality of biometric data types includes at least a first biometric data type and a second biometric data type that is different from the first biometric data type;

comparing the received biometric data to stored biometric data for the user includes comparing respective received biometric data for each biometric data type to stored biometric data that corresponds to the same biometric data type as the respective received biometric data according to a respective predefined threshold for the respective biometric data type.

13. The method of claim 12, further comprising:

at the computing device:

in response to a determination that each received biometric data type falls within the respective predefined threshold in comparison to the respective stored biometric data, animating a respective feature of the avatar according to the respective biometric data type, wherein the respective feature is animated based on biometric data corresponding to the respective biometric data type.

14. The method of claim 12, wherein:

the biometric data includes first biometric data corresponding to a first biometric data type and second biometric data corresponding to a second biometric data type;

the first biometric data is different from the second biometric data;

comparing the received biometric data to stored biometric data for the user according to a predefined threshold includes comparing the first biometric data to stored biometric data corresponding to the first biometric data type according to a first predefined threshold that corresponds to the first biometric data type; and the one or more features of the avatar are animated based on the second biometric data.

15. The method of claim 12, further comprising:

at the computing device:

in response to a determination that at least a predetermined amount of the received biometric data falls within the predefined threshold in comparison to the stored biometric data, animating the one or more features of the avatar according to the received biometric data; and in response to a determination that less than the pre-determined amount of the received biometric data falls within the predefined threshold in comparison to the stored biometric data, ceasing animation of the one or more features of the avatar.

16. The method of claim 1, wherein the stored biometric data and the predefined threshold comprise a profile for the user, and the profile further specifies user selection of the one or more features of the avatar and user selection of biometric data types used to animate the one or more features of the avatar.

17. The method of claim 1, further comprising:

at the computing device:

in response to a request to access information restricted to the user:

comparing the received biometric data to the stored biometric data; and in response to a determination that the received biometric data falls within the predefined threshold in comparison to the stored biometric data, granting access to the information restricted to the user.

18. The method of claim 1, further comprising:

at the computing device:

in response to identifying a transmission gap that is greater than a threshold time while receiving the biometric data, ceasing animation of the one or more features of the avatar.

19. A computing device, comprising:

one or more processors;

memory;

a display; and one or more programs stored in the memory and config-ured for execution by the one or more processors, the one or more programs comprising instructions for:

receiving biometric data for the user;

comparing the received biometric data to stored bio-metric data for the user according to a predefined threshold;

in response to a determination that the received bio-metric data falls within the predefined threshold in comparison to the stored biometric data, animating one or more preselected features of the avatar according to the received biometric data; and in response to a determination that the received bio-metric data does not fall within the predefined threshold in comparison to the stored biometric data, ceasing animation of the one or more preselected features of the avatar.

20. A non-transitory computer-readable storage medium storing one or more programs configured for execution by a computing device having one or more processors, memory, and a display, the one or more programs comprising instruc-tions for:

receiving biometric data for the user;

comparing the received biometric data to stored biometric data for the user according to a predefined threshold;

in response to a determination that the received biometric data falls within the predefined threshold in comparison to the stored biometric data, animating one or more predefined features of the avatar according to the received biometric data; and in response to a determination that the received biometric data does not fall within the predefined threshold in comparison to the stored biometric data, ceasing ani-mation of the one or more predefined features of the avatar.

* * * * *